US010858554B2

United States Patent
Feng et al.

(10) Patent No.: US 10,858,554 B2
(45) Date of Patent: Dec. 8, 2020

(54) HIGH RESIDUAL CONTENT (HRC) KRAFT/SODA LIGNIN AS AN INGREDIENT IN WOOD ADHESIVES

(71) Applicant: FPINNOVATIONS, Pointe-Claire (CA)

(72) Inventors: Martin W. Feng, Vancouver (CA); Guangbo He, New Westminster (CA); Yaolin Zhang, Quebec (CA); Xiang-Ming Wang, Quebec (CA); Lamfeddal Kouisni, Pointe-Claire (CA); Michael Paleologou, Beaconsfield (CA)

(73) Assignee: FPInnovations, Pointe-Claire (CA)

( * ) Notice: Subject to any disclaimer, the term of this patent is extended or adjusted under 35 U.S.C. 154(b) by 149 days.

(21) Appl. No.: 15/130,107

(22) Filed: Apr. 15, 2016

(65) Prior Publication Data
US 2016/0304757 A1    Oct. 20, 2016

Related U.S. Application Data

(60) Provisional application No. 62/147,816, filed on Apr. 15, 2015.

(51) Int. Cl.
*C09J 161/06* (2006.01)
*C08G 14/10* (2006.01)
(Continued)

(52) U.S. Cl.
CPC ............. *C09J 161/06* (2013.01); *C08G 8/38* (2013.01); *C08G 14/08* (2013.01); *C08G 14/10* (2013.01);
(Continued)

(58) Field of Classification Search
CPC .... C09J 161/06; C09J 197/005; C09J 161/34; C09J 161/12; C08G 8/38; C08G 14/08;
(Continued)

(56) References Cited

U.S. PATENT DOCUMENTS 2,168,160 A    8/1939    Hochwalt et al.
2,282,518 A    5/1942    Hochwalt et al.
(Continued)

FOREIGN PATENT DOCUMENTS

WO    2006031175    3/2006
WO    2014124541    8/2014

OTHER PUBLICATIONS

Beis et al. Fast Pyrolysis of Lignins. BioResources 5(3), 1408-1424. 2010 (Year: 2010).*
(Continued)

*Primary Examiner* — John E Uselding
(74) *Attorney, Agent, or Firm* — Norton Rose Fulbright

(57) ABSTRACT

Most processes currently being proposed and/or used for the production of lignin from kraft or soda black liquors are capable of producing two main types of lignin: high residual content (HRC) lignin and low residual content (LRC) lignin. Surprisingly, it was discovered that HRC lignin, is a suitable ingredient in alkaline adhesives, particularly wood adhesives of the phenolic type (e.g. resole resins). This biomaterial is environmentally green and remarkably low cost, which makes it an industrially viable material to be used as a novel and major ingredient in phenolic adhesives for the manufacture of exterior grade plywood, laminated veneer lumber, oriented strand board (OSB) and other wood products—this was successfully demonstrated in a number of laboratory experiments as well as several different mill trials. The composition, preparation and application of such wood adhesives are hereby disclosed.

13 Claims, 5 Drawing Sheets

(51) Int. Cl.
  *C09J 197/00* (2006.01)
  *C09J 161/34* (2006.01)
  *C08G 8/38* (2006.01)
  *C08G 14/08* (2006.01)
  *C09J 161/12* (2006.01)
  *C08L 97/00* (2006.01)
  *C08L 61/12* (2006.01)
  *C08L 61/34* (2006.01)
  *C08L 61/06* (2006.01)

(52) U.S. Cl.
  CPC ............... *C08L 61/06* (2013.01); *C08L 61/12* (2013.01); *C08L 61/34* (2013.01); *C08L 97/005* (2013.01); *C09J 161/12* (2013.01); *C09J 161/34* (2013.01); *C09J 197/005* (2013.01)

(58) Field of Classification Search
  CPC ....... C08G 14/10; C08L 97/005; C08L 61/12; C08L 61/34; C08L 61/06
  See application file for complete search history.

(56) References Cited

U.S. PATENT DOCUMENTS

| | | | |
|---|---|---|---|
| 4,105,606 A | | 8/1978 | Forss et al. |
| 4,113,542 A | | 9/1978 | Johansson |
| 4,303,562 A | * | 12/1981 | Hollis, Jr. ............... C08G 8/28 156/335 |
| 4,306,999 A | | 12/1981 | Adams et al. |
| 4,537,941 A | | 8/1985 | Kambanis et al. |
| 5,202,403 A | | 4/1993 | Doering |
| 6,632,912 B2 | | 10/2003 | Sudan |
| 8,501,841 B2 | | 8/2013 | Winterrowd et al. |
| 8,771,464 B2 | | 7/2014 | Kouisni et al. |
| 8,816,007 B2 | | 8/2014 | Zhang et al. |
| 2011/0294991 A1 | | 12/2011 | Lake et al. |
| 2012/0041146 A1 | * | 2/2012 | Zhang ...................... C08H 6/00 525/135 |
| 2015/0210845 A1 | * | 7/2015 | Cothran ............... C09J 197/005 524/10 |
| 2016/0096985 A1 | * | 4/2016 | Knight ................... C09J 161/12 428/355 CP |

OTHER PUBLICATIONS

Uloth, V.C. and Wearing, J.T., Kraft lignin recovery: acid precipitation versus ultrafiltration. Part I. Laboratory test results Pulp & Paper Canada, 90(9), 67-71, T310-T314(1989).

Uloth, V.C. and Wearing, J.T., Kraft lignin recovery: acid precipitation versus ultrafiltration. Part II. Technology and economics Pulp & Paper Canada, 90(10), 34-37, T357-T-360 (1989).

Loutfi, H., Blackwell, B. and Uloth, V., Lignin recovery from kraft black liquor: preliminary process design; Tappi Journal, 203-210, Jan. 1991.

Ragnar et al., in "pKa-values of guaicacyl and syringyl phenols related to lignin", Journal of Wood Chemistry and Technology, 20(3), 277-305 (2000).

A. Pizzi's book entitled "Advanced Wood Adhesives Technology" Chapter 4, p. 112.

International Search Report dated Jul. 8, 2016 from corresponding PCT/CA2016/050436.

Westin et al. "Kraft lignin wood fiberboards—The effect of kraft lignin addition to wood chips or board pulp prior to fiberboard production", Holz als Roh—und Werkstoff 58 (2001) 393-400.

Marques et al. "Chemical Composition of Spent Liquors from Acidic Magnesium-Based Sulphite Pulping of Eucalyptus globulus", Journal of Wood Chemistry and Technology, 29:4, 322-336.

Holmqvist et al. "Ultrafiltration of kraft black liquor from two swedish pulp mills", Chemical Engineering Research and Design, 83(A8): 994-999.

Gosselink et al. "Effect of periodate on lignin for wood adhesive application", Holzforschung, vol. 65, pp. 155-162, 2011.

Froass et al. "Nuclear Magnetic Resonance Studies. 4. Analysius of Residual Lignin after Kraft Pulping", Ind. Eng. Chem. Res. 1998, 37, 3388-3394.

Baumberger et al. "Molar mass determination of lignins by size-exclusion chromatography: towards standardisation of the method", Holzforschung, vol. 61, pp. 459-465, 2007.

MeadWestvaco, Indulin C product data bulletin.

Safety Data Sheet of dewaterd kraft lignin from Domtar.

Hu et al. "Structural Characterization of Pine Kraft Lignin: BioChoice Lignin vs Indulin AT",Jounral of Wood Chemistry and Technology 36:432-446, 2019.

Domtar Inc., Safety Data Sheet—Biochoice Lignin, pp. 1-7, Mar. 5, 2020.

Domtar Inc., Biochoicetm Lignin FAQS, pp. 1-2, Jan. 2020.

* cited by examiner

HIGH RESIDUAL CONTENT (HRC) KRAFT/SODA LIGNIN AS AN INGREDIENT IN WOOD ADHESIVES

BACKGROUND i) Field

The present description relates to novel adhesive compositions which contain high residual content (HRC) lignin produced from black liquor particularly wood adhesives. The description further relates to the use of such lignins in phenolic adhesive formulations for the manufacture of exterior-grade plywood, laminated veneer lumber (LVL), Oriented Strandboard (OSB), Particleboard (PB), and Medium Density Fibreboard (MDF).

ii) Description of the Prior Art

In the soda and kraft pulping processes, sodium hydroxide and white liquor (sodium hydroxide and sodium sulfide), respectively, are used as pulping chemicals along with heat and pressure to partially separate lignin and other components of the wood from the cellulose fibers in the wood chips. The residual pulping chemicals along with the residual organic chemicals removed from the wood chips during the pulping and subsequent pulp washing processes, end up in the so-called weak black liquor (WBL) which is concentrated from about 15-20% solids to about 70-80% solids using the multiple-effect evaporators and concentrators. The concentrated black liquor is then fed to the recovery furnace where the organics in black liquor are combusted, thereby producing carbon dioxide, water and heat. The heat produced in the recovery furnace is used to produce steam, power and pulping chemicals for internal mill use. The organic constituents of black liquor include: lignin, tall oil soaps, polysaccharides, oligosaccharides, sugar monomers, saccharinic acids, several low molecular weight organic acids such as acetic acid, lactic acid and formic acid, as well as several organic sulphur compounds such as dimethyl sulphide, dimethyldisulphide and mercaptan (in the case of kraft black liquor). The inorganic constituents of black liquor include: sodium, sodium hydroxide and sodium carbonate, as well as sodium sulphide, sulphite, thiosulphate and sulphate in the case of kraft black liquor. In addition, black liquor contains small amounts of chloride, potassium, calcium and other multivalent metals.

Due to the high content of black liquor with respect to Chemical Oxygen Demand (COD), Biochemical Oxygen Demand (BOD), Totally Reduced Sulphur (TRS) and Volatile Organic Carbon (VOC), it is no longer acceptable to discharge it directly to the receiving waters and/or the mill effluent treatment system. Furthermore, its use as a dust suppressant on dirt roads or other applications is no longer practiced or has greatly been diminished. It is preferable to burn black liquor at the mill site in the recovery boiler or to extract any one of its components in a relatively purified form prior to use in any given application. Lignin is one example of a black liquor component of commercial interest because of its unique chemical and physical properties. Lignin is one of the main constituents of black liquor comprising 30-40 wt % of black liquor solids.

Presently, lignin precipitation by acidification is the most common method used for lignin recovery from kraft black liquor. A number of such processes were previously proposed and/or implemented (e.g. Uloth, V. C. and Wearing, J. T., Kraft lignin recovery: acid precipitation versus ultrafiltration. Part I. Laboratory test results" Pulp & Paper Canada, 90(9), 67-71 (1989); Uloth, V. C. and Wearing, J. T., Kraft lignin recovery: acid precipitation versus ultrafiltration. Part II. Technology and economics" Pulp & Paper Canada, 90(10), 34-37 (1989); Loutfi, H., Blackwell, B. and Uloth, V., Lignin recovery from kraft black liquor: preliminary process design; Tappi Journal, 203-210, January 1991; Ohmann, F., Theliander, H., Tomani, P. and Axegard, P., Method for separating lignin from black liquor, WO2006/031175 A1; Kouisni, L. and Paleologou, M., U.S. Pat. No. 8,771,464 B2, Jul. 8, 2014).

In most of the above processes, black liquor acidification is predominantly performed by using either carbon dioxide or a mineral acid (e.g. sulphuric acid) or a combination of the two to drop the pH of the black liquor from about 13-14 to about 10 (pKa of phenolic hydroxyl groups), at which pH, lignin comes out of solution in the colloidal form. The lignin colloidal suspension is then kept in a tank for the lignin colloidal particles to coagulate to a size that is easy to filter and wash. After acidification and coagulation, the lignin is then filtered to produce a lignin cake of high residual content (hereby referred to as high residual content (HRC) lignin) which is, subsequently, washed with acid (e.g. sulphuric acid) and water to produce a purified lignin (hereby referred to as low residual content (LRC) lignin) at a solids content of 40 to 70% wt. (where solids content is understood as the non-volatile portion of the lignin).

The use of LRC lignin as an ingredient of wood adhesives of the phenolic type is not new. The common belief among those skilled in the art of using lignin in phenolic adhesive applications in wood products is that the purity of the lignin is important, with high-purity lignin being desirable when used in such adhesive formulations. For example, Winterrowd et al., U.S. Pat. No. 8,501,841 B2, Aug. 6, 2013, state that: " . . . it is important to separate the degraded lignin from the other compounds in the black liquor such as sulfate salt and carbohydrates, which can have deleterious effects on the emission potential of a binder, the strength development rate, and/or the ultimate bond strength. Some compounds in whole black liquor or whole spent sulphite liquor can have deleterious effects on the performance of a phenolic binder resin for an OSB application" (Column 3, lines 35-43). Furthermore, in an effort to address the problems created by the various black liquor impurities in lignin the same investigators state: "As used herein degraded lignin polymer is lignin which has been isolated as a precipitate from kraft pulping liquor by addition of one or more acids or carbon dioxide to adjust the pH of the black liquor to a pH of 7 to 12 and washed to remove the contaminants described above" (Column 4, lines 24-29). Therefore, reports of applications of kraft lignin in wood adhesives have been mostly based on the use of powdered LRC lignin, which is typically obtained by acid precipitation (e.g. with carbon dioxide) of lignin from a kraft pulping black liquor, followed by washing with acid (e.g. sulphuric acid) and water. Such an LRC lignin typically contains low levels of inorganic (ash) and organic impurities. However, using lignin in the powdered high purity form (LRC lignin) in phenolic adhesive formulations appears to lead to several problems which have not been addressed to any significant extent in the prior art. For example, most resin manufacturers are not equipped to handle powdered materials. Hence, it would be desirable for lignin to be provided to them in the liquid form. It is known in the prior art that lignin can be solubilized in sodium hydroxide solutions. However, if the lignin is in the high-purity form (e.g. LRC lignin), this usually leads to several problems relating to: a) the limited amount of lignin that can be dissolved in the reaction mixture b) the slow kinetics of dissolution, c) the high viscosity of the resultant solutions (especially at high solids content) and d) the low reactivity of the lignin towards formaldehyde and/or methylolated phenol (U.S. Pat. No. 4,306,999). In addition, it is especially desirable that the lignin solutions are available at high solids content to avoid the introduction of excessive amounts of water into the reaction medium—this is because, in addition to the water that enters the reaction through the various reactants, the reaction of phenol with formaldehyde generates significant amounts of water thereby imposing a limit on any additional water input to the reaction mixture.

In an effort to prepare lignin solutions that are suitable for the manufacture of lignin-based PF resins, kraft lignin has been dispersed in different media such as alkaline solutions (e.g. 10% sodium hydroxide or ammonia), phenol-water or sodium hydroxide-water-phenol solutions (U.S. Pat. Nos. 2,168,160; 2,282,518; 4,306,999; 4,303,562). For example, to prepare lignin-based phenol-formaldehyde resins, Hollis Jr. and Schoenher (U.S. Pat. No. 4,303,562) used a lignin solution as prepared by the method of Adams and Schoenher (U.S. Pat. No. 4,306,999) with the resin preparation being conducted in two steps: 1) preparation of a pre-condensed resin by reacting formaldehyde and phenol in the presence of an alkaline catalyst (sodium hydroxide) and 2) reacting the pre-condensed resin with formaldehyde, sodium hydroxide and a lignin concentrate having at least 40% solids.

Similarly, Doering (U.S. Pat. No. 5,202,403), prepared a lignin-based PF resin in two or three steps: a) reacting formaldehyde and phenol at a mole ratio of formaldehyde to phenol of less than about 1.0 in the presence of an alkaline catalyst; b) reacting the precursor resin with lignin to form a lignin-modified phenol-formaldehyde precursor resin, and c) reacting the lignin-modified phenol-formaldehyde precursor with additional formaldehyde sufficient to provide a cumulative formaldehyde to phenol mole ratio of between about 2.0 and 3.0. The lignin, in this case, was added in the form of a 50 wt % solution.

Forss and Fuhrmann (U.S. Pat. No. 4,105,606) added lignosulfonates or alkali lignins to PF resins with and without addition of an aldehyde (formaldehyde, paraformaldehyde or furfural). However, according to this description, a specific molecular weight distribution is required in order to have good resin performance. In the case of lignosulfonates and alkali lignin, a minimum of 65% and 40% by weight of the lignin solutions, respectively, must have a relative molecular weight in excess of that of 5000 Da.

In addition, it is mentioned in the prior art that the solubility of LRC lignin is related to many factors including the lignin source and the history of the black liquor from which it is recovered (U.S. Pat. No. 4,306,999). For example, Adams and Schoenher (U.S. Pat. No. 4,306,999) observed that lignin recovered from aged and oxidized black liquors is more difficult to dissolve and keep in solution than lignin obtained from fresh black liquor. To address the lignin solubility issue, these investigators developed an approach by which a lignin solution having an excess of 40% solids was solubilized in phenol-water or phenol-water-sodium hydroxide or ammonia solutions.

SUMMARY

In accordance with one aspect, there is provided a wood adhesive comprising a formaldehyde; a phenol; an alkaline hydroxide; and an HRC lignin.

In accordance with another aspect, there is provided a wood adhesive comprising a phenol formaldehyde resin; and an HRC lignin.

In accordance with another aspect, there is provided a wood adhesive comprising an HRC lignin and at least one of i) a formaldehyde; a phenol; and an alkaline hydroxide or ii) a phenol formaldehyde resin.

In accordance with another aspect, there is provided the wood adhesive herein described further comprising an alkaline hydroxide.

In accordance with another aspect, there is provided the wood adhesive herein described wherein the HRC lignin has an ash content of 1.9 to 30 wt % ash and a pH of greater than 3.8 to 11.2.

In accordance with another aspect, there is provided the wood adhesive herein described wherein the HRC lignin is derived from an oxidized black liquor.

In accordance with another aspect, there is provided the wood adhesive herein described wherein the HRC lignin is derived from unoxidized black liquor.

In accordance with another aspect, there is provided the wood adhesive herein described wherein the HRC lignin is selected from the group consisting of softwood, hardwood, annual plants and combinations thereof.

In accordance with another aspect, there is provided the wood adhesive herein described wherein the HRC lignin is derived from a kraft pulping process, pre-hydrolysis kraft or a soda pulping process.

In accordance with another aspect, there is provided the wood adhesive herein described wherein the HRC lignin is a typical HRC lignin with an ash content of greater than 12.9 to 30 wt % ash, and a pH of greater than 8 to 11.2.

In accordance with another aspect, there is provided the wood adhesive herein described wherein the HRC lignin is a water-washed HRC lignin with an ash content of greater than 6 to 12.9 wt % ash and a pH of greater than 7 to 8.

In accordance with another aspect, there is provided the wood adhesive herein described wherein the HRC lignin is an MRC lignin with an ash content of 1.9 to 6 wt % ash and a pH of greater than 3.8 to 7.

In accordance with another aspect, there is provided the wood adhesive herein described wherein the HRC lignin is 0.5 to 50 wt % of the adhesive solids.

In accordance with another aspect, there is provided the wood adhesive herein described wherein the HRC lignin is 2.5 to 30 wt % of the adhesive solids.

In accordance with another aspect, there is provided the wood adhesive herein described wherein the HRC lignin is 2.5 to 50 wt. %, preferably from 2.5 to 30 wt % of the adhesive solids.

In accordance with another aspect, there is provided a method of producing a wood adhesive comprising providing an HRC lignin; providing a formaldehyde, a phenol and an alkaline hydroxide; mixing the HRC lignin, the alkaline hydroxide; and adding the formaldehyde and the phenol to produce the adhesive.

In accordance with another aspect, there is provided a method of producing a wood adhesive comprising providing a phenol formaldehyde resin; providing an HRC lignin; mixing the HRC lignin, and the phenol formaldehyde resin to produce the adhesive.

In accordance with another aspect, there is provided a method of producing a wood adhesive comprising providing an HRC lignin; and at least one of i) providing a formaldehyde, a phenol and an alkaline hydroxide; or ii) providing a phenol formaldehyde resin; mixing the HRC lignin and either i) the alkaline hydroxide, formaldehyde and phenol or ii) the phenol formaldehyde resin to produce the adhesive.

In accordance with another aspect, there is provided the method herein described wherein the HRC lignin is derived from an oxidized black liquor.

In accordance with another aspect, there is provided the method herein described wherein the HRC lignin is derived from an unoxidized black liquor.

In accordance with another aspect, there is provided the method herein described wherein the HRC lignin is selected from the group consisting of softwood, hardwood, annual plants and combinations thereof.

In accordance with another aspect, there is provided the method herein described wherein the HRC lignin is derived from a kraft pulping process, a pre-hydrolysis kraft or a soda pulping process.

In accordance with another aspect, there is provided the method herein described wherein the HRC lignin is a typical HRC lignin with an ash content of greater than 12.9 to 30 wt % ash, and a pH of greater than 8 to 11.2.

In accordance with another aspect, there is provided the method herein described wherein the HRC lignin is a water-washed HRC lignin with an ash content of greater than 6 to 12.9 wt % ash and a pH of greater than 7 to 8.

In accordance with another aspect, there is provided the method herein described wherein the HRC lignin is an MRC lignin with an ash content of 1.9 to 6 wt % ash and a pH of greater than 3.8 to 7.

In accordance with another aspect, there is provided the method herein described wherein the HRC lignin is 0.5 to 50 wt % of the adhesive.

In accordance with another aspect, there is provided the method herein described wherein the HRC lignin is 2.5 to 30 wt % of the adhesive.

In accordance with another aspect, there is provided a wood product comprising a wood adhesive herein described.

In accordance with another aspect, there is provided the wood product herein described wherein the wood product is selected from the group consisting of plywood, laminated veneer lumber (LVL), oriented strand board (OSB) and medium density fibreboard (MDF).

In accordance with another aspect, there is provided the wood product herein described, wherein the plywood is an exterior grade plywood.

In accordance with another aspect, there is provided an adhesive comprising an HRC lignin and at least one of the following selected from the group consisting of i) a formaldehyde, a phenol, an alkaline hydroxide; ii) a phenol formaldehyde resin; iii) Melamine-Urea-Phenol-Formaldehyde (MUPF) resins; iv) phenol resorcinol formaldehyde (PRF) resins; and combinations thereof.

In accordance with another aspect, there is provided the adhesive herein described further comprising an alkaline hydroxide.

In accordance with another aspect, there is provided the adhesive herein described wherein the HRC lignin is derived from an oxidized black liquor.

In accordance with another aspect, there is provided the adhesive herein described wherein the HRC lignin is derived from unoxidized black liquor.

In accordance with another aspect, there is provided the adhesive herein described wherein the HRC lignin is selected from the group consisting of softwood, hardwood, annual plants and combinations thereof.

In accordance with another aspect, there is provided the adhesive herein described wherein the HRC lignin is derived from a kraft pulping process, pre-hydrolysis kraft or a soda pulping process.

In accordance with another aspect, there is provided the adhesive herein described wherein the HRC lignin is a typical HRC lignin with an ash content of greater than 12.9 to 30 wt % ash, and a pH of greater than 8 to 11.2.

In accordance with another aspect, there is provided the adhesive herein described wherein the HRC lignin is a water-washed HRC lignin with an ash content of greater than 6 to 12.9 wt % ash and a pH of greater than 7 to 8.

In accordance with another aspect, there is provided the adhesive herein described wherein the HRC lignin is an MRC lignin with an ash content of 1.9 to 6 wt % ash and a pH of greater than 3.8 to 7.

In accordance with another aspect, there is provided the adhesive herein described wherein the HRC lignin is 0.5 to 50 wt % of the adhesive solids.

In accordance with another aspect, there is provided the wood adhesive herein described wherein the HRC lignin is 2.5 to 30 wt % of the adhesive solids.

In accordance with another aspect, there is provided a method of producing an adhesive comprising i) providing one of the following selected from the group consisting of i) a formaldehyde, a phenol, an alkaline hydroxide; ii) a phenol formaldehyde resin; iii) Melamine-Urea-Phenol-Formaldehyde (MUPF) resins; iv) phenol resorcinol formaldehyde (PRF) resins; and combinations thereof, providing an HRC lignin; and mixing the HRC lignin with one of the following selected from the group consisting of i) the formaldehyde, the phenol, the alkaline hydroxide; ii) the phenol formaldehyde resin; iii) the Melamine-Urea-Phenol-Formaldehyde (MUPF) resins; iv) the phenol resorcinol formaldehyde (PRF) resins; and combinations thereof to produce the adhesive.

In accordance with another aspect, there is provided the method herein described further comprising providing an alkaline hydroxide.

DETAILED DESCRIPTION

Figure 1A:
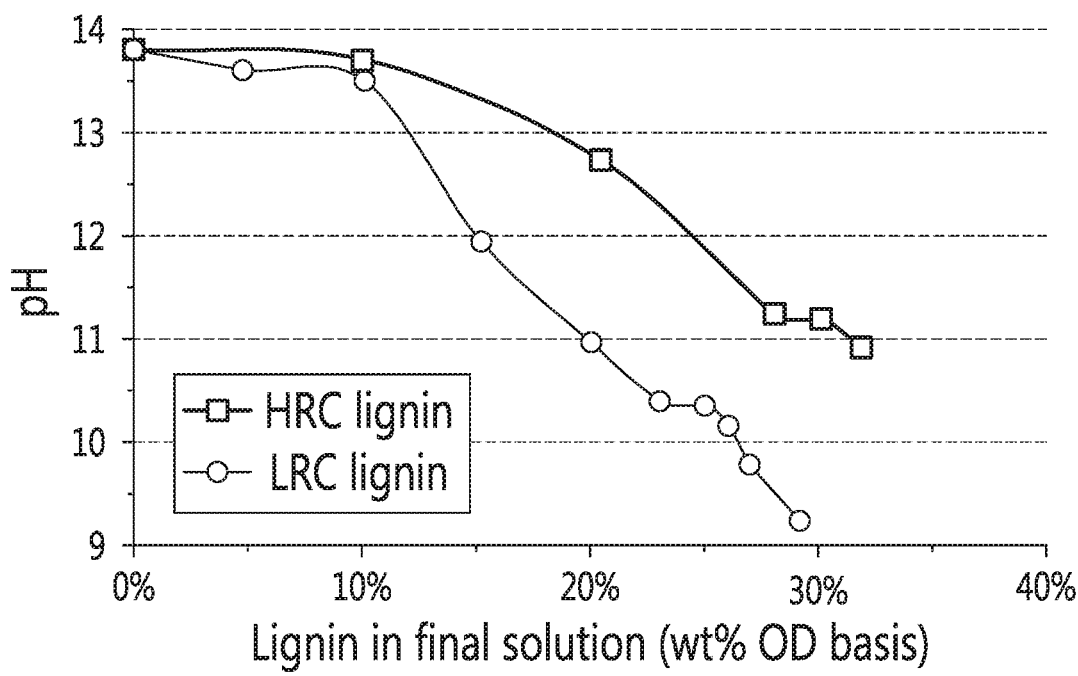
FIG. 1a illustrates a graph of pH versus lignin concentration in 3 wt % NaOH solution where the lignin is Lignoforce™ HRC lignin and LRC lignin on an Oven Dry (OD) basis wt %.

In an effort to recover lignin from kraft, pre-hydrolysis kraft (dissolving kraft) and soda black liquors, a number of approaches have been considered in the prior art, which mostly use acid addition to precipitate lignin from black liquor. In most of these processes, it is difficult to separate the lignin from the acidified black liquor solutions. Even though these approaches work to a certain extent, the filtration resistance is still quite high leading to unreasonably low filtration rates and, in certain cases, a lignin product of low dry solids content. This, in turn, leads to a large filtration area being required in the equipment needed for lignin filtration leading to high capital costs as well as increased drying costs for the lignin. A second problem associated with most lignin precipitation processes using acid is the large amount of acid (e.g. carbon dioxide and/or sulphuric acid) that is needed to induce the lignin to come out of solution and/or be converted from the sodium to the hydrogen form (e.g. during suspension of the lignin cake in an acid solution or the washing of the lignin with acid on the filter). A third problem associated with most lignin acid precipitation processes is the emission of totally reduced sulphur (TRS) compounds during most stages of the process. Such compounds which include hydrogen sulphide, methyl mercaptan, dimethyl sulphide and dimethyl disulphide are strongly odorous compounds with well-known negative effects on human health and other forms of life.

To eliminate or reduce the risk on human health, reduce the chemical consumption, and improve the lignin filterability, FPInnovations developed a new process called the LignoForce System™ (U.S. Pat. No. 8,771,464) the description of which is incorporated herein by reference that uses a black liquor oxidation step that converts sulphur species of the TRS such as hydrogen sulphide, methyl mercaptan, dimethyl sulphide and dimethyl disulphide, present in the kraft black liquor, are oxidized to non-volatile species such as thiosulphate and sulphate (in the case of $H_2S$), methane sulphonic acid (in the case of mercaptan), dimethyl sulphoxide and dimethyl sulphone (in the case dimethylsulphide) and methane sulphonic acid (in the case of dimethyl disulphide). Due to the exothermic nature of these oxidation reactions, the degree of dissociation of the lignin charged groups (e.g. phenolic groups) decreases leading to increased lignin colloid agglomeration and coagulation to form larger lignin particles (and larger particles lead to higher filtration rates). In addition, the acids produced in this step, mainly from TRS and carbohydrates present in the black liquor, lead to a reduction in the pH of the liquor, thereby reducing purchased acid requirements.

A further surprising advantage of the HRC lignin described herein is lower VOC (volatile organic compound) emissions then conventional lignin, and produce less VOC's (especially when heated) in the production of various products (i.e. PF and PF resin adhesive) when compared to conventional lignins.

The recovered lignin could be used in many applications including as an ingredient in phenolic-adhesive formulations.

An HRC (high residual content) lignin is defined as a non-LRC lignin and as such has a high residual inorganic and organic content. There are several categories of HRC lignin. Typical HRC includes an ash content of greater than 12.9 to 30 wt % ash, and a pH of greater than 8 to 11.2.

Water-washed HRC (WWHRC) has an ash content of greater than 6 to 12.9 wt % ash and a pH of greater than 7 to 8.

While a third category of the HRC is Medium Residual Content (MRC) lignin that is partially acid washed and has an ash content of 1.9 to 6 wt % ash and a pH of greater than 3.8 to 7, and preferably from greater than 2 to 6 wt % ash and a pH of greater than 4 to 7.

The HRC lignin can be obtained from softwood, hardwood, (including eucalyptus), or annual plants by using either the kraft, pre-hydrolysis kraft (dissolving kraft) or the soda process. Furthermore, HRC lignin can be recovered from oxidized or un-oxidized black liquor.

HRC lignin can be used in phenolic adhesives as an aqueous alkaline solution, as a wet cake, or as a dry powder.

Phenolic-type adhesive formulations used for manufacturing exterior-grade plywood and laminated veneer lumber typically contain 60-80 wt % of liquid phenol-formaldehyde (PF) resin, 10-15 wt % of additives (usually fillers and extenders such as wheat flour, corncob flour, soda ash, etc.) with the balance being water. The final solids content of the glue mix is in the range of 40-44 wt. %. The addition of additives is aimed at adjusting the rheological performance, moderating glue penetration and distribution on the wood surface, improving the pre-press tack property and dry-out resistance, and reducing costs. The glue mix is produced in a glue mixer by mechanically mixing the phenolic resin with various additives at certain ratios in a certain order for a predefined mixing time.

Adhesive formulation or adhesive solid content weight % for panel making includes resin and may or may not include fillers/extenders, depending on the final application or type of panel. (i.e. adhesive solids include PF resin in the case of OSB panels, MDF and PB, and PF+fillers or additives in the case of plywood and LVL). Adhesive solids weight % is the non-volatile portion after oven-drying under specified oven conditions. The volatile portion is mainly water and/or solvent in the adhesive.

The inventors discovered that HRC lignin which is produced from black liquor is a suitable ingredient in wood adhesives of the phenolic type. This biomaterial is environmentally green and remarkably low cost, which makes it an industrially viable material to be used as a novel and major ingredient in phenolic adhesives for the manufacture of exterior grade plywood, laminated veneer lumber (LVL), oriented strandboard (OSB) and other wood products. In particular, the inventors discovered that HRC lignin can not only replace phenolic resin precursors (e.g. phenol), or phenolic resin (e.g. PF resin), but also fillers and extenders such as wheat flour, corncob flour, bark flour and soda ash—these are usually added in the glue mix used as an adhesive in the manufacturing of exterior-grade plywood panels and laminated veneer lumber.

Surprisingly, the inventors have found that HRC lignin produced from black liquor that was oxidized beyond what is needed to destroy 95% of TRS compounds (e.g. as produced by the patented LignoForce System™, U.S. Pat. No. 8,771,464), and hereby referred to as LignoForce™ lignin), can easily be dissolved and/or dispersed in low-concentration sodium hydroxide solutions (e.g. 3-10 wt %) and/or PF resin formulation media for use in the direct formulation of wood glue mix and the manufacture of lignin-PF resins to be employed as adhesives in various wood products. In contrast to LRC lignin, HRC lignin, and especially HRC lignin from the LignoForce™ process, was found to exhibit: a) higher solubility and speed of dissolution in phenolic adhesive formulations, b) reduced sodium hydroxide (or sodium carbonate) requirements for achieving the required glue mix pH or resin pH, c) better compatibility with phenol-formaldehyde glue mixes with respect to rheological properties, which are very important to the successful application on wood surfaces of the resin through common industrial glue applicators such as curtain coater, etc., and d) better reactivity—this is despite the fact that such HRC lignins typically contain much higher levels of ash, and other impurities. In addition, the inventors found that the performance of lignin-based PF resins prepared in situ by reaction of phenol, formaldehyde, HRC LignoForce™ lignin and sodium hydroxide or by post-blending of HRC LignoForce™ kraft lignin with commercial PF resins, was comparable or better than that of commercial PF resins.

It should be understood here that for the purposes described herein a typical HRC lignin is lignin of a high residual content with a pH close to the $pK_a$ of phenolic hydroxyl groups (pH=10). At this pH, about 50% of the phenolic hydroxyl groups are in the sodium form while the remaining 50% are in the hydrogen (acid) form. It should also be understood, however, that HRC lignin can be obtained at any pH between 8-11 since, at pH 11, lignin begins to precipitate from black liquor and continues to do so until pH 8-9. It should also be understood here, that the $pK_a$ of phenolic hydroxyl groups can vary to a certain extent depending on the substituents on the benzene rings found in lignin. For example, Ragnar et al., in "$pK_a$-values of guaicacyl and syringyl phenols related to lignin", Journal of Wood Chemistry and Technology, 20(3), 277-305 (2000) reported $pK_a$ values between 6.2 and 11.3 for lignin-related phenolic groups. Depending on the precipitation pH, the phenolic hydroxyl groups of HRC lignin will be mostly in the sodium form at pH levels over the pKa of phenolic hydroxyl groups (e.g. pH range: 10-11 assuming a $pK_a$ of 10 for phenolic groups) and mostly in the hydrogen form for precipitation pH levels below the $pK_a$ of phenolic hydroxyl groups (e.g. pH range: 8-10). HRC lignin can be produced at a higher purity and additional favourable properties with respect to its use in phenolic glue applications if, ahead of the black liquor acidification step referred to above, an enhanced black liquor oxidation step is included as, for example, discussed in Kouisni and Paleologou, U.S. Pat. No. 8,771,464 B2, Jul. 8, 2014. This process, called LignoForce™, is currently being commercialized. Furthermore, this process allows the production of a range of lignins having different residual organic and inorganic content and consequently different pH values ranging from 2 to 10.

The description herein introduces LignoForce™ HRC lignin among other HRC lignins as a novel ingredient to be used in phenolic type of alkaline adhesives employed in the manufacture of exterior plywood, laminated veneer lumber, oriented strand board and other wood products. The content of such lignin in plywood glue mix formulations, for example, could be from 0 to 50 wt. %, preferably from 2.5 to 30 wt % of glue mix solids. The lignin as a novel ingredient in the phenolic glue mix is used to substitute the phenolic resin (e.g. PF resin) at substitution levels from 0 to 35 wt %, but preferably from 0 to 25 wt %, and/or substitute the above-mentioned additives (e.g. fillers and extenders such as wheat flour, corncob residue, soda ash, etc.) at substitution levels from 0 to 100 wt %. It is also possible according to the description herein that only one or two of the additives be partially or fully substituted in the phenolic glue mix. The LignoForce™ HRC lignin can be directly mixed with other ingredients during the production of the phenolic glue mix with no lumps or aggregates forming in the glue mix.

It should be understood here that, for the purposes described herein, HRC-type of lignins can be produced not only from processes that use a press to concentrate the lignin slurry generated from the acidification of black liquor using carbon dioxide or other acids (e.g. LignoForce™, LignoBoost™ and Mead-Westvaco processes). Other lignin-recovery processes which use other lignin concentration approaches such as decantation of the supernatant solution (e.g. Liquid Lignin Process™ as described in Michael A. Lake, and John C. Blackburn, Process for recovering lignin, US Patent Application No. 20110294991, Dec. 1, 2011) or black liquor filtration (e.g. using ultrafiltration membranes) can be used to generate such lignins.

Table 1 presents the composition of HRC lignin from the LignoForce™ process compared to LRC lignin from this process. As seen in this table, for example, the ash content of HRC lignin could be as high as 182× the ash content of LRC lignin while the sodium content of HRC lignin could be as high as 169× the sodium content of LRC lignin.

TABLE 1

| Lignin composition | | |
|---|---|---|
| | HRC softwood kraft lignin | LRC softwood kraft lignin |
| Ash, wt % | 1.9-30 | 0.11-1.8 |
| pH | 3.8-10.5 | 2-3.7 |
| Organics, wt % | 80-87.1 | 98.2-99.9 |
| Lignin, wt % | 56.4-72.2 | 90.9-99.9 |
| Acid-insoluble lignin, wt % | 49.9-73.6 | 89.3-97.8 |
| Acid-soluble lignin, wt % | 1.17-6.71 | 1.25-3.88 |
| Na, wt % | 0.12-10 | 0.059-0.9 |
| S, wt % | 1.41-2.93 | 1.46-2.38 |
| Sugars, wt % | 0.7-2.92 | 1.23-2.4 |
| HHV, BTU/lb | 6378-9517 | 10797-11851 |
| C, % | 47.3-58.4 | 65.8-68.1 |
| H, % | 4.4-5.9 | 5.8-6.0 |
| N, % | 0.02-0.07 | 0.03-0.04 |

In an effort to identify the reasons for which HRC lignins work quite well as an ingredient in wood adhesive compositions, several tests were conducted with HRC and LRC lignins in the wet form. First, the inventors compared the effect of LignoForce™ HRC and LRC lignin concentration in alkaline solutions composed of 3 wt % and 10 wt % NaOH, on solution pH and viscosity. The results are summarized in FIG. 1.

Figure 1B:
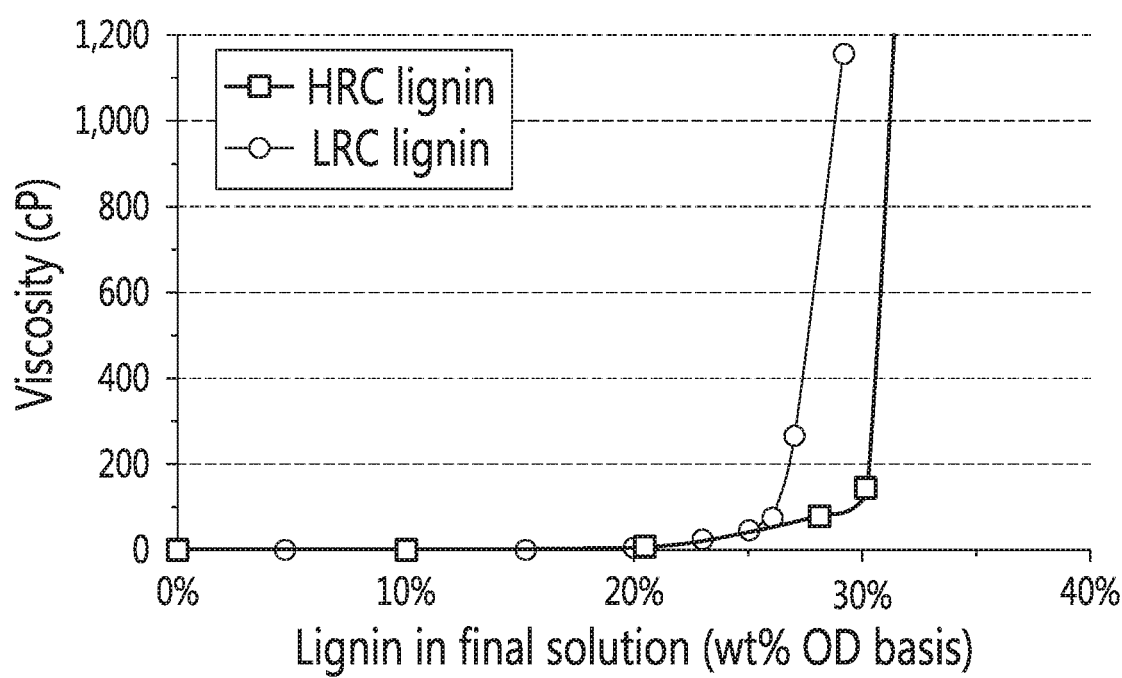
FIG. 1b illustrates a graph of viscosity versus lignin concentration in 3 wt % NaOH solution where the lignin is Lignoforce™ HRC lignin and LRC lignin on an Oven Dry (OD) basis wt %.
Figure 2A:
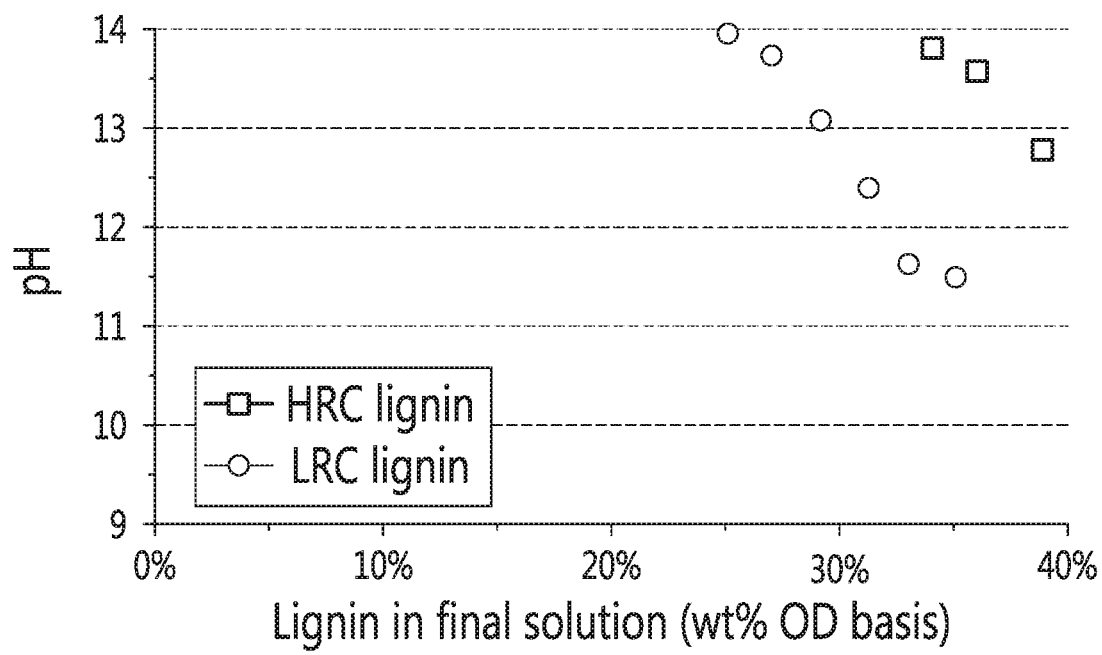
FIG. 2a illustrates a graph of pH versus lignin concentration in 10 wt % NaOH solution where the lignin is Lignoforce™ HRC lignin and LRC lignin on an Oven Dry (OD) basis wt %.
Figure 2B:
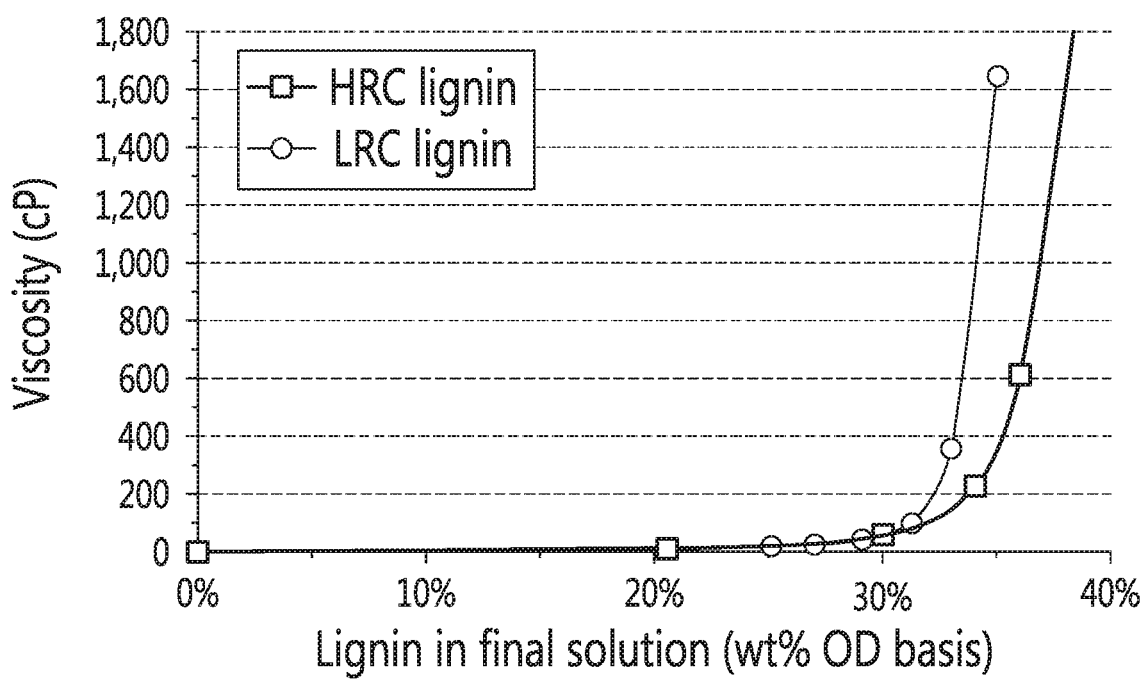
FIG. 2b illustrates a graph of viscosity versus lignin concentration in 10 wt % NaOH solution where the lignin is Lignoforce™ HRC lignin and LRC lignin on an Oven Dry (OD) basis wt %.

As shown in FIG. 1, at any given lignin concentration, the pH of the solution prepared with LRC lignin is lower than that of the solution prepared with HRC lignin. This difference in pH can be ascribed to the fact that, in the case of LRC lignin a) no residual alkali are present in the lignin itself and b) all phenolic and carboxylic acid groups are in the acid form. As a result of these two reasons, a higher amount of caustic is required to bring the pH of the resin solution to the targeted pH required for the reaction of phenol, lignin and formaldehyde (which ranges from 9-12)

especially if high amounts of lignin are used. In addition, as shown in FIG. 1, solutions of a higher lignin concentration can be prepared when HRC lignin is used, before the viscosity increases dramatically. The same results were obtained in 10 wt % caustic solution (FIG. 2).

Figure 3A:
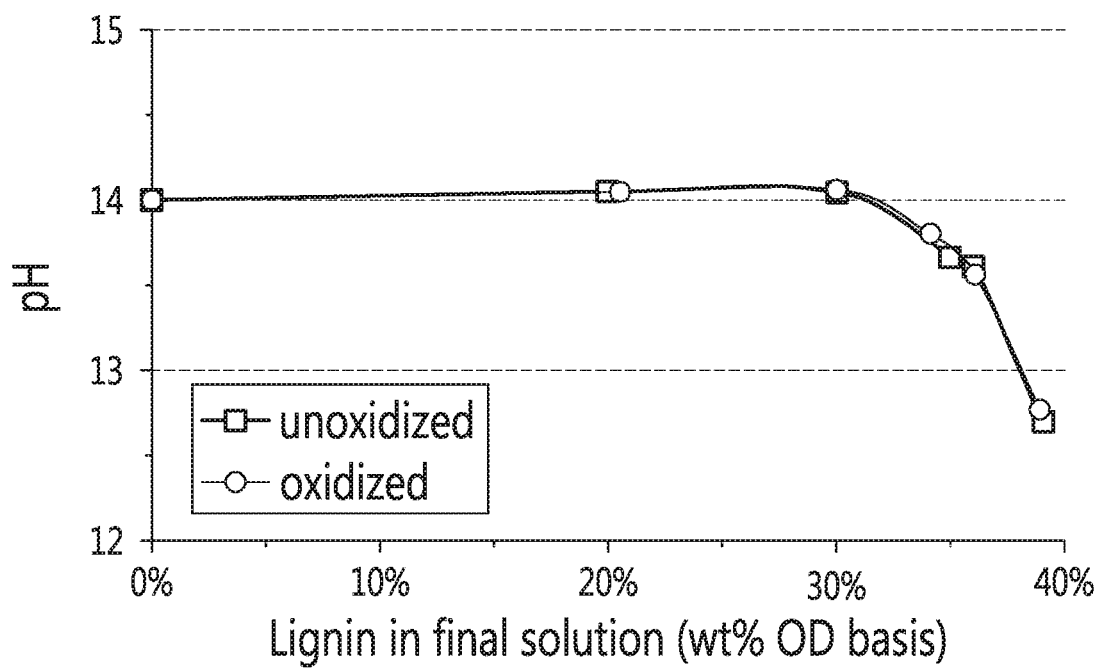
FIG. 3a illustrates a graph of pH versus lignin concentration in 10 wt % NaOH solution in the case of HRC lignins generated from oxidized and unoxidized black liquors.
Figure 3B:
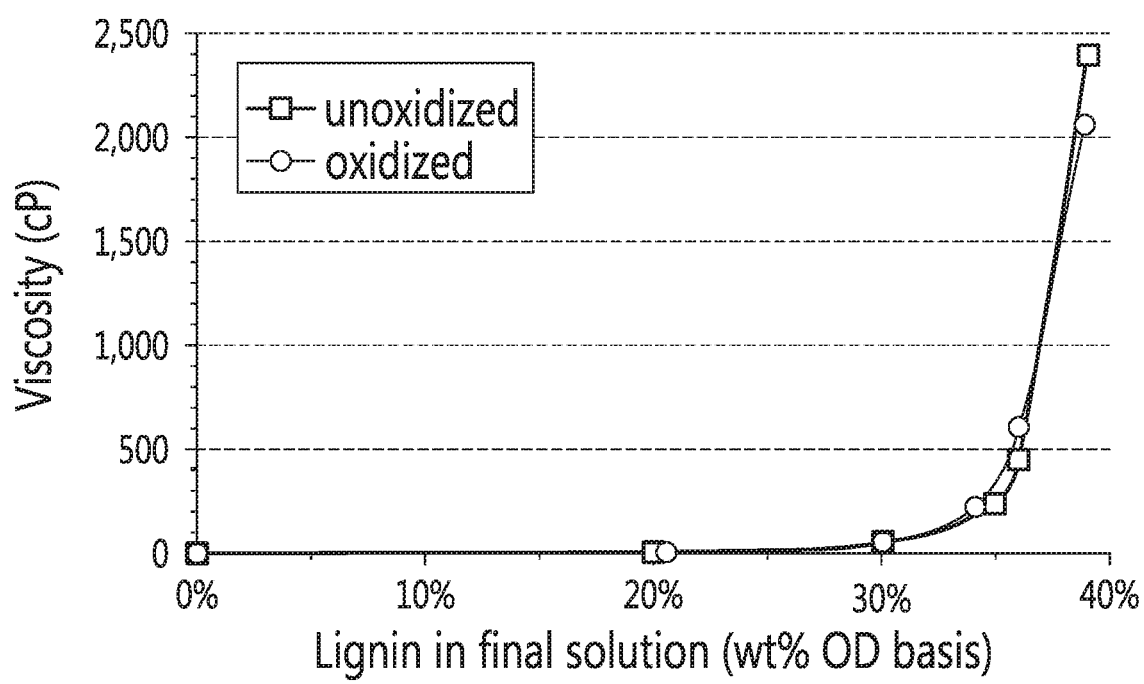
FIG. 3b illustrates a graph of viscosity versus lignin concentration in 10 wt % NaOH solution in the case where HRC lignins are generated from oxidized and unoxidized black liquors.

Secondly, the inventors compared the effect of lignin concentration in 10 wt % NaOH on solution pH and viscosity in the case of HRC lignins generated from oxidized and unoxidized black liquor. The two solutions were prepared from lignin samples at 63 wt % moisture content. The results obtained are shown in FIG. 3. As shown in this figure, at any given lignin concentration, no major difference is observed in the pH or viscosity of the two lignin solutions. In both cases, more than 35 wt % lignin could be solubilized in 10 wt % NaOH.

Figure 4A:
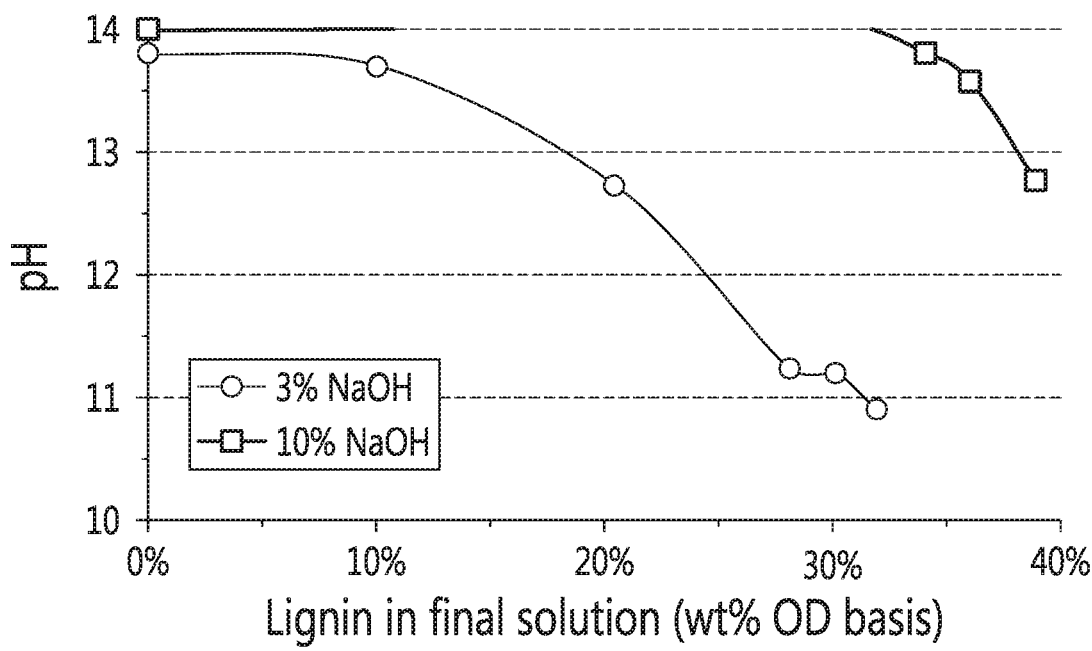
FIG. 4a illustrates a graph of pH versus lignin concentration in the case of LignoForce™ HRC lignins dissolved in 3% NaOH and 10% NaOH sodium hydroxide solutions.
Figure 4B:
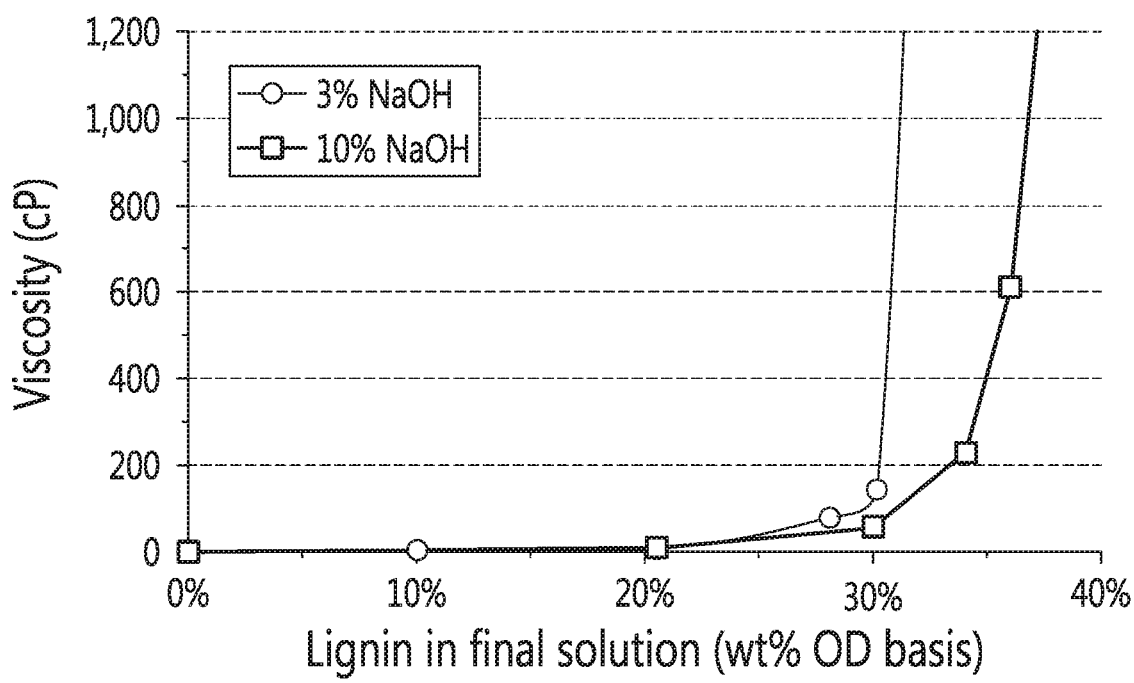
FIG. 4b illustrates a graph of viscosity versus lignin concentration in the case of LignoForce™ HRC lignins dissolved in 3 and 10% sodium hydroxide solutions.

Since the pH of lignin solutions in 10 wt % caustic solutions might be too high from the optimum range needed to initiate the reaction of phenol with formaldehyde in the manufacture of phenol formaldehyde (PF) resins (usually prepared at pH values lower than 11), a solution of a lower caustic concentration (3 wt %) was evaluated for solubilizing HRC lignins from oxidized black liquor. As shown in FIG. 4, a 3 wt % caustic solution would be sufficient to prepare lignin solutions containing up to 30 wt % HRC lignin since, at this caustic and lignin dosage levels, the pH of the lignin solution dropped to around 11 and only a small difference was observed in the viscosity of the HRC lignin solution prepared at 3 wt % vs 10 wt % caustic. However, if one is interested in a lignin solution containing more than 30 wt % lignin, a higher concentration of caustic solution would be needed.

Figure 5:
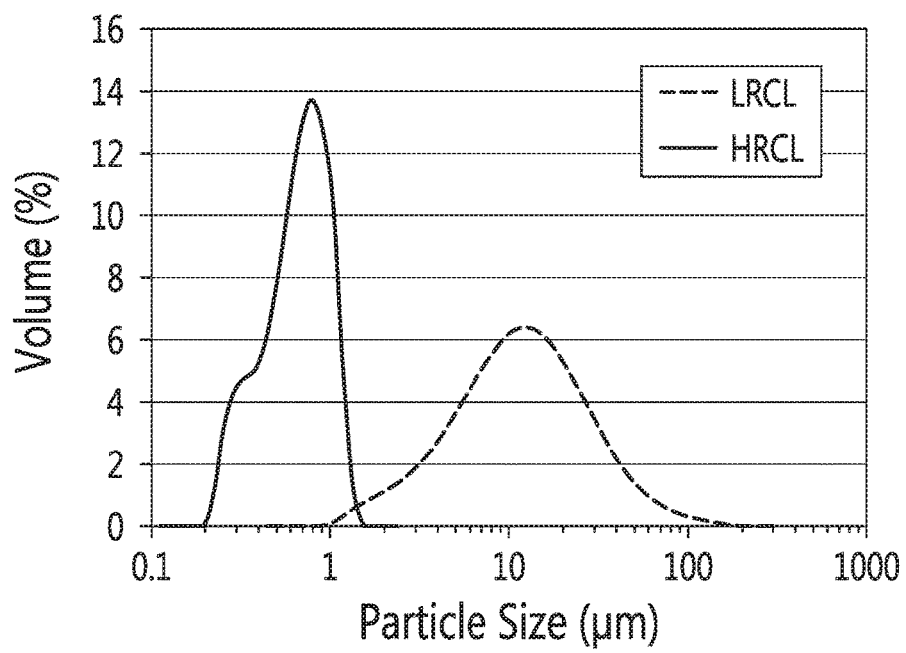
FIG. 5 illustrates a particle size distribution of ground HRC and LRC lignins in water.

In an effort to understand the differences in the solubility and speed of dispersion of HRC vs LRC lignins the inventors analyzed the particle size distribution of both lignins in aqueous solutions. The results are presented in FIG. 5.

Before the measurement, a pestle and mortar was used to grind both HRC and LRC lignins under the same conditions. The size distribution curves of the ground lignin are given in FIG. 5. Although the grinding conditions were identical, both the mean size and size distribution range of the ground HRC lignin were much smaller than those of the LRC lignin. The ground LRC lignin had a size range from about 1 µm to about 200 µm while the volume weighted mean size, d(vol.), was 16.7 µm. In comparison, the HRC lignin was composed of particles ranging from 0.2 µm to 1.7 µm with a d(vol.) of only 0.7 µm. This can be explained based on the following reasons:

a) In contrast to LRC lignin, HRC lignin incorporates large amounts of ash in the form of sodium salts or sodium ions associated with phenolic and carboxylic acid groups in the lignin (please see Table 1). The large amount of sodium salts present among the precipitated lignin particles could function as a barrier in terms of preventing them from agglomerating with each other to form larger particles.

b) In contrast to LRC lignin, HRC lignin is of high pH. At high pH values, intramolecular and intermolecular hydrogen bonding in lignin is expected to be reduced thereby preventing the lignin particles from agglomerating with each other to from larger particles.

Figure 6:
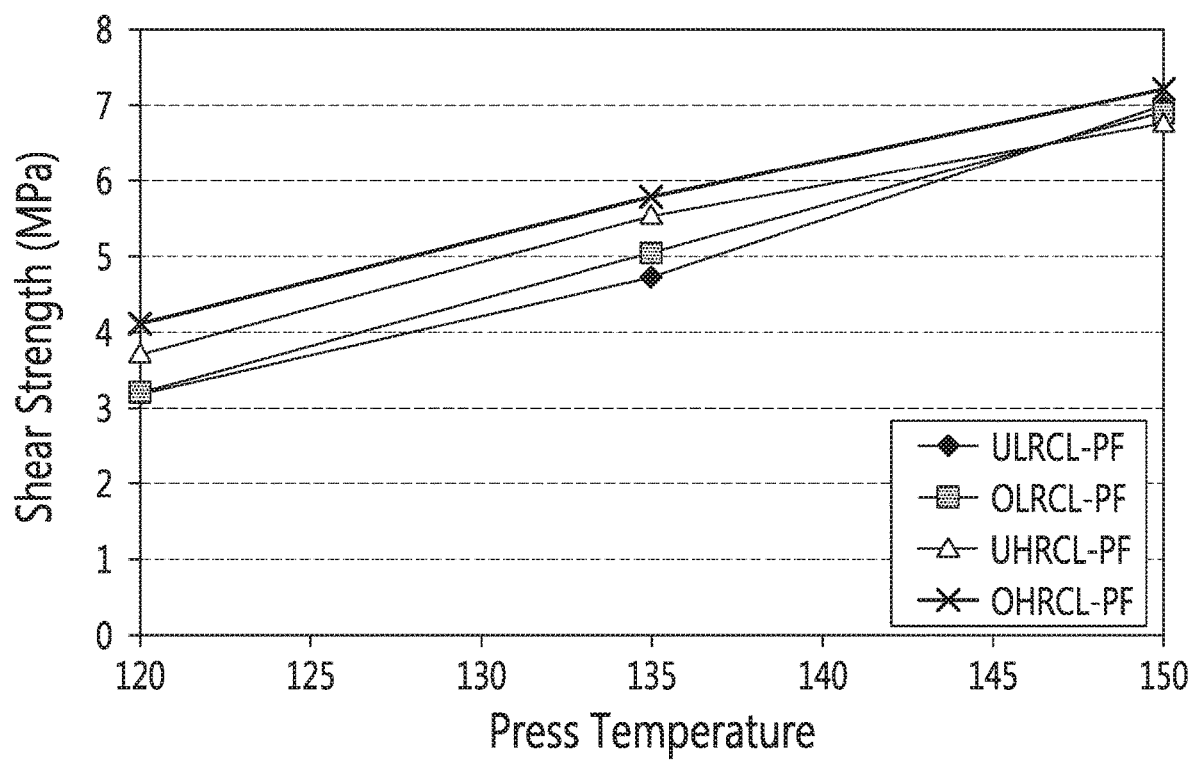
FIG. 6 illustrates a graph of shear strength (MPa) versus press temperature (° C.) for four lignin-PF resins at three press temperatures and 90 seconds pressing time using ABES.

As discussed before, HRC lignin exhibits very different chemical composition and properties from those of LRC lignin. In addition, HRC lignin produced from oxidized black liquor (e.g. via the LignoForce™ process) exhibits different chemical composition and properties from those of lignin produced from unoxidized black liquor. In an effort to observe the impact of these differences on the performance of these lignins as feedstock materials in the production of lignin-based phenol-formaldehyde (lignin-PF) resins and the application of these resole resins as wood adhesives, these lignins (i.e. HRC and LRC lignins obtained from the LignoForce™ process (from oxidized black liquor), as well as HRC and LRC lignins obtained from conventional processes (without black liquor oxidation) were used, respectively, in the syntheses of four lignin-based PF resins using the same synthesis procedure and formulation, where the weight ratio between lignin and phenol was kept at 1:2. In order to obtain the same final pH value for each of the lignin-based PF resins, the sodium hydroxide addition rate was adjusted during each resin synthesis according to the alkalinity of each lignin type. The resulting adhesive resins were tested for pH, viscosity, solids content and acid buffer capacity (see Table 2). These resins were also tested for their ability to develop bond strength with wood at three different press temperatures and a fixed press time using the Automatic Bond Evaluation System (ABES), which is a well-known test method in the field of wood adhesives and which is currently being developed to become a standard ASTM test method (see table 3 and FIG. 6).

TABLE 2

Properties of four lignin-based PF resins

| Lignin-PF | pH | Viscosity (cps) | Solids Weight (wt %) | Acid Buffer Capacity to pH 10 (meq/g resin solids) | NaOH Weight (wt %) |
|---|---|---|---|---|---|
| OLRCL-PF | 10.75 | 211 | 43.3 | 0.07 +/− 0.03 | 8.5 |
| OHRCL-PF | 10.55 | 436 | 43.7 | 0.33 +/− 0.08 | 7.6 |
| ULRCL-PF | 10.59 | 224 | 44.1 | 0.07 +/− 0.10 | 8.5 |
| UHRCL-PF | 10.46 | 340 | 46.2 | 0.10 +/− 0.02 | 7.0 |

OLRCL-PF: Lignin-based PF resin prepared with LignoForce LRC lignin (lignin obtained from oxidized BL)
OHRCL-PF: Lignin-based PF resin prepared with LignoForce HRC lignin (lignin obtained from oxidized BL)
ULRCL-PF: Lignin-based PF resin prepared with conventional LRC lignin (lignin obtained from unoxidized BL)
UHRCL-PF: Lignin-based PF resin prepared with conventional HRC lignin (lignin obtained from unoxidized BL)

TABLE 3

Bond strength of four lignin-based PF resins at three press temperatures and a 90 sec press time using ABES (including standard deviations in parenthesis)

| Press Temperature (° C.) | ULRCL-PF (MPa) | OLRCL-PF (MPa) | UHRCL-P (MPa) | OHRCL-PF (MPa) |
|---|---|---|---|---|
| 120 | 3.17 (0.29) | 3.22 (0.17) | 3.73 (0.19) | 4.10 (0.23) |
| 135 | 4.70 (0.18) | 5.03 (0.31) | 5.55 (0.56) | 5.77 (0.42) |
| 150 | 6.98 (0.61) | 6.90 (0.47) | 6.77 (0.70) | 7.20 (0.57) |

As can be seen in Table 2, the two lignin-based PF resins made with HRC lignins (produced from oxidized and unoxidized black liquor) appear to have higher acid buffer capacities compared to the two other lignin-based PF resins made of LRC lignins (produced from oxidized and unoxidized black liquor). This was particularly the case for the resin made of HRC lignin produced from oxidized black liquor (e.g. via the LignoForce™ process), which showed by far the highest acid buffer capacity among the four resins even though all these resins had similar pH values. As described in Chapter 4, page 112 of A. Pizzi's book entitled "Advanced Wood Adhesives Technology", a very large portion of the total world output of PF resins is used at very high alkalinity, generally at pH 10-13, which imparts higher reactivity and shorter curing time to the adhesive resins. Conceivably, a high acid buffer capacity allows a phenolic resin to resist changes in pH due to wood acids thereby maintaining a pH and reactivity in the optimum range during the curing process. Therefore, HRC lignins, and, in particular, HRC lignins produced from oxidized black liquor, have certain advantages over LRC lignins in terms of resin reactivity when used as a feedstock for lignin-PF resin manufacturing. This was further substantiated by the ABES test results of shear strength vs. press temperature for the four lignin-based PF resins, as illustrated in Table 3 and FIG. 6. As shown here, the two resins made with HRC lignins (produced from oxidized and unoxidized black liquor) exhibited higher bond strength development than the two resins made with LRC lignins (produced from oxidized and unoxidized black liquor) at lower press temperatures. In particular, the lignin-based PF resin made from HRC lignin derived from oxidized black liquor demonstrated the highest bond strength development. These results provide clear evidence that the use of HRC lignins and, in particular, HRC lignins produced from oxidized black liquor, demonstrate great advantages over LRC lignins in the production of lignin-PF adhesive resins in terms of resin bondability, reactivity and cost.

The preparation of resole lignin-based phenol-formaldehyde (LPF) resins is conducted at alkaline pH values. Hence, if the lignin is in the acid form, as is the case with LRC lignins, large amounts of sodium hydroxide or sodium carbonate need to be used to raise the pH of the reaction medium to the alkaline range (e.g. pH=8-11). As a result of the unique configuration and flexibility of the LignoForce™ system, the inventors have been able to produce lignins of different residual contents and pH values.

that by adjusting the amount of wash water added, the inventors can produce lignins with an ash content ranging from 7 to near 30 wt % and a pH from 8 to near 11.2 The inventors refer to this new family of lignins as Water Washed High Residual Content (WWHRC) lignins. Based on the results previously presented in relation to HRC and LRC lignins, the inventors expect MRC and WWHRC lignins to perform at a level intermediate between HRC and LRC lignins with respect to resin bondability, reactivity and cost in the manufacture of lignin-based PF resins. More importantly, the inventors expect such lignins to provide the flexibility needed to use lignin in several other applications at optimum residual content and/or pH for any given application.

One way to incorporate HRC LignoForce™ and/or other kraft lignins into a glue mix is to make a lignin solution (or suspension) first, and then directly mix such a lignin solution or suspension into the glue mix. Such a lignin solution or suspension can be produced by dissolving (or dispersing) the above-mentioned lignin in an alkaline aqueous solution or water. The HRC lignin content in the solution or suspension should be in the range of 5-50 wt %, preferably from 15 to 40 wt %, further preferably from 20 to 30 wt %.

As seen in Example 1 below, using LRC lignin from a conventional process (a process in which the black liquor was not adequately oxidized) as a replacement of PF resin in plywood glue led to the production of plywood panels with inferior shear strength and wood failure rates. When such lignin was used to replace filler in plywood glue, the shear strength of the plywood panels were comparable with the controls but the wood failure rate was significantly below that of the control and below what would be required by

TABLE 4

Production of lignin of different residual contents and pH values

| | Exp # | | | | | | | |
|---|---|---|---|---|---|---|---|---|
| | 1 | 2 | 3 | 4 | 5 | 6 | 7 | 8 |
| % of $H_2SO_4$ based on exp #1* | 100% | 65% | 61% | 49% | 38% | 21% | 0% (the cake was washed with water only) | 0% (without any water wash) |
| Ash, wt % OD | 0.60 | 0.90 | 1.6 | 2.2 | 2.9 | 3.7 | 7.0 | 30 |
| Na, wt % OD | 0.050 | 0.090 | 0.16 | 0.21 | 0.38 | 0.95 | 2.7 | 6.7 |
| S, wt % | 1.75 | 1.80 | 1.79 | 1.77 | 1.91 | 1.78 | 1.43 | 2.01 |
| pH of a 10 wt % mixture in distilled water (at RT) | 3.23 | 3.83 | 4.54 | 4.96 | 5.74 | 7.02 | 9.28 | 9.66-11.2 |

*normalized to the amount used for the production of LRC lignin

As shown in Table 4 (columns 2-6), by simply changing the acid charge used in the washing step (without any major changes to LignoForce System™ operation), different lignins having different residual contents (expressed here in the form of ash content) and pH values were produced. In addition to the two common lignins (LRC lignin of an ash content of 0.6 wt % and a pH of 3.23 and HRC lignin of an ash content of 19.53 wt % and a pH of 9.66), the inventors have been able to produce lignins of an ash content ranging from 0.9-3.7 wt % and a pH ranging from 3.83 to 7.02. The inventors refer to this new family of lignins as Medium Residual Content (MRC) lignins. Furthermore, the inventors have, surprisingly, found that LignoForce™ HRC lignin can be washed with only water, without any major negative impact on filtration rates, providing a lignin with an ash content of 7.02 wt % and a pH of 9.28. These results suggest Canadian Standard CSA O151-04 "Canadian Softwood Plywood". On the contrary, when HRC LignoForce™ lignin was used to replace PF resin in plywood glue and/or fillers, both the shear strength and wood failure rates of the test panels produced were as good as or better than the controls (please see Examples 2-5) and well within the limits of Canadian Standard CSA O151-04 "Canadian Softwood Plywood".

Example 1

Evaluation of Conventional LRC Lignin as a Replacement of PF Resin in Softwood Plywood Glue Mix An aqueous solution of 10% NaOH was prepared. The solution was mixed until it became completely homogeneous. The lignin used in this experiment was produced using a conventional process in which the black liquor was not oxidized. Lignin was produced from this 30% solids liquor by:

a) Acidifying the black liquor with carbon dioxide to a pH of about 10 to induce the lignin to come out of solution in the form of colloidal particles
b) Allowing time for the lignin particles to coagulate to larger particles
c) Filtering the lignin suspension to remove the residual black liquor
d) Washing the lignin cake with sulphuric acid and water to produce a purified lignin in the acid form (LRC lignin).

Four different mixtures of LRC lignin in 10 wt % NaOH were then prepared. The lignin concentrations were 10, 15, 20 and 25 wt %. The solutions were mixed until complete dispersion of the lignin was accomplished.

After a few hours, the lignin in the 10 wt %, 15 wt % and 20 wt. % lignin solutions was fully dispersed, and the solutions appeared stable. Lignin in the 25 wt. % solution was more difficult to disperse and sediment was always present. After one day, a small deposit appeared at the bottom of container for the 20 wt % solution while the 10 wt % and 15 wt % lignin solutions were still stable. After one week sitting under ambient conditions, the mixtures were filtered through a 14-mesh screen to determine the solubility of the kraft lignin. Our observations are summarized in Table 5. The solutions with 10 wt. % lignin and 15 wt. % lignin were still stable and free of any sediment.

TABLE 5

Solubility of LRC lignin in 10 wt % sodium hydroxide aqueous solution after one week

| Lignin in 10% NaOH solution | Observations |
| --- | --- |
| 10% | Soluble |
| 15% | Soluble |
| 20% | Partially soluble |
| 25% | Partially soluble |

Four glue mixes at the 0 wt %, 20 wt %, 25 wt % and 30 wt % PF replacement levels with LRC lignin were prepared. The composition of these mixtures is shown in Table 6. The viscosity of these mixtures is shown in Table 4. As shown in this table, all of these glue mixes had viscosities suitable for plywood gluing through a roll-spreader (glue applicator).

TABLE 6

Composition of plywood glue mixtures in which a portion of the PF resin was replaced by LRC lignin

| | PF resin substitution level by LRC lignin* | | | |
| --- | --- | --- | --- | --- |
| | 0 wt % | 20 wt % | 25 wt % | 30 wt % |
| PF resin (44% solids) | 114.41 | 83.54 | 73.77 | 65.07 |
| 1$^{st}$ Water | 44.49 | 0.00 | 0.00 | 0.00 |
| Wheat flour | 13.98 | 12.76 | 12.02 | 11.36 |
| Lignin** | 0.00 | 16.85 | 19.84 | 22.50 |
| 10% NaOH solution | 0.00 | 95.47 | 112.40 | 127.48 |
| PDC filler (corncob) | 17.48 | 15.95 | 15.03 | 14.20 |
| Soda ash (sodium carbonate) | 6.36 | 5.80 | 5.46 | 5.16 |
| Mix for 30 minutes | | | | |
| PF resin (44% solids) | 95.34 | 69.62 | 61.48 | 54.23 |
| 2$^{nd}$ Water | 7.94 | 0.00 | 0.00 | 0.00 |

TABLE 6-continued

Composition of plywood glue mixtures in which a portion of the PF resin was replaced by LRC lignin

| | PF resin substitution level by LRC lignin* | | | |
| --- | --- | --- | --- | --- |
| | 0 wt % | 20 wt % | 25 wt % | 30 wt % |
| Mix for 5 minutes | | | | |
| Total | 300.00 | 300.00 | 300.00 | 300.00 |
| Solids (%) | 43.37 | 42.77 | 41.03 | 39.49 |

*Lignin substitution of PF resin was on a "solids to solids" basis. The ingredients in the recipes were on a weight basis.
**Lignin and 10 wt % NaOH solution were pre-mixed before being added to the glue mix. The concentration of lignin in the NaOH solution was 15 wt % (i.e., Lignin:10% NaOH = 15:85 wt./wt.)

TABLE 7

Viscosity of glue mixes

| | PF resin substitution level by LRC lignin | | | |
| --- | --- | --- | --- | --- |
| | 0 wt % | 20 wt % | 25 wt % | 30 wt % |
| Temperature of glue mix (° C.) | 31 | 28 | 27 | 25 |
| Viscosity (cps) immediately after mixing (before cooling to 25° C.) | 7280 | 5220 | 3330 | 2510 |
| Viscosity at 25° C. (cps) | 8150 | 5780 | 3600 | 2510 |

A typical softwood plywood glue mix recipe was selected as the control mix and the base model for substitution of the PF component with LRC lignin. Three different levels of PF substitution were tested (20 wt %, 25 wt % and 30 wt % replacement). Each glue mix was formulated to have the same level of total solids and resin/lignin solids. A pre-mix of lignin and 10 wt % NaOH aqueous solution at a wt./wt. ratio of 20:80 was used for the preparation of these glue mixes. In addition, the replacement of the filler component with LRC lignin (in the form of a powder) was also evaluated. The viscosity of the mix increased with lignin content but all mixtures were usable. A total of 50 plywood panels (3-ply, 12"×12") were produced using ⅛" thick Douglas-fir veneers, of which 10 panels each were bonded, respectively, with glue mixes in which 0% (control), 20%, 25% and 30% of PF resin was replaced by lignin. In addition, a glue mix was prepared in which 100% of the corn cob filler was replaced with LRC lignin. The plywood panels were manufactured according to the following parameters:
Board dimensions: 2"×12"
Glue mix loading rate: 30 lb/1000 ft$^2$ (single glue line)
Plywood veneers: ⅛" thick dry Douglas fir veneers
Press platen temperature: 150° C. (302° F.)
Press pressure: 200 psi (1.38 MPa)
Press time: 240 seconds The resulting panels were allowed to hot stack for 24 hours before samples were cut in accordance with the CSA standards. Ten test specimens were tested after subjecting them to the vacuum/pressure and boil-dry-boil treatments. The test specimens were cut so that each group of ten would have five samples with open pull and five with closed pull in order that the shear strength might be compared.

The Vacuum/pressure test was performed after treatment in water at 21° C. and a vacuum of −25 inHg for 0.5 hour, followed by 5 atm (75 psi) pressure for 0.5 hour. The resulting samples were then tested for shear strength and % wood failure rate. The boil-dry-boil test was performed after boiling the board samples in water for 4 hours and then drying at 65° C. for 20 hours, followed by boiling in water again for 4 hours. After cooling in cold water, the resulting samples were then tested for shear strength and % wood failure rate.

The average test results of shear strength and % wood failure rate are summarized in Table 8. Based on the data in Table 8, it appears that replacing PF resin with LRC lignin in the glue mixes resulted in reduced bonding strength. Replacing the corn cob filler with LRC lignin powder maintained or somewhat enhanced the shear strength but the wood failure rate was still low. It was also noted that the resulting glue mix was thinner than the control mix.

TABLE 8

Average test results of shear strength and wood failure (WF) rate

| | Vacuum/Pressure | | Boil-Dry-Boil | |
|---|---|---|---|---|
| Glue Type | Shear (psi) | WF (%) | Shear (psi) | WF (%) |
| 0% LRC lignin | 183.9 (±44.9) | 69.7 (±32.9) | 169.2 (±48.6) | 78.7 (±28.5) |
| 20% LRC lignin | 165.8 (±49.7) | 34.1 (±32.4) | 135.1 (±45.3) | 30.8 (±31.0) |
| 25% LRC lignin | 156.6 (±41.1) | 18.1 (±24.7) | 119.3 (±34.7) | 13.6 (±19.1) |
| 30% LRC lignin | 146.1 (±42.1) | 24.2 (±28.4) | 116.3 (±39.3) | 33.2 (±34.9) |
| 100% of corn cob filler replaced with LRC lignin | 211.1 (±51.1) | 55.8 (±37.5) | 164.9 (±35.0) | 38.4 (±34.3) |

Based on the experimental data obtained, the following observations can be made:
1. The LRC lignin sample was soluble in a 10 wt % sodium hydroxide aqueous solution at the 10 wt % and 15 wt % concentration levels but only partially soluble at the 20 wt % and 25 wt % concentration levels
2. The viscosity of glue mixes at the 20 wt. %, 25 wt. % and 30 wt. % PF resin substitution levels with LRC lignin at 25° C. were 5780, 3600 and 2510 cps, respectively
3. Replacing PF resin with LRC lignin in the glue mixes resulted in reduced plywood bonding strength
4. Replacing the corncob filler with LRC lignin powder maintained or somewhat enhanced the plywood shear strength but the wood failure rate was lower than the control.

Example 2

Substitution of 30 wt % of Commercial Phenol-Formaldehyde (PF) Resin with HRC Softwood LignoForce™ Lignin in Bonding High-Density Wood (Yellow Birch)

The lignin used in this experiment was produced from 30 wt % solids softwood black liquor using the LignoForce™ process (Kouisni and Paleologou, U.S. Pat. No. 8,771,464 B2, Jul. 8, 2014) as follows:
a) The black liquor was oxidized using oxygen beyond the point at which at least 95% of TRS compounds are oxidized
b) The oxidized black liquor of step a) was acidified with carbon dioxide to a pH of about 10 to induce the lignin to come out of solution in the form of colloidal particles
c) The lignin slurry of step b) was allowed to stand for about 60 min for the lignin particles to coagulate to larger particles
d) The lignin slurry of step c) was filtered using a filter press to remove the residual black liquor to produce HRC lignin at 50-60 wt % solids
e) The HRC lignin of step d) was used as needed.

In this investigation, a commercial phenolic resin (coded as ComPF) for plywood application was used. The resin solids content was 45 wt. %, the viscosity 460 cps, and the pH 12.3. HRC lignin in the powder form, as prepared by the LignoForce™ process as described above, was applied to this phenolic resin to form a 30:70 mixture (coded as HRC30-PF). The adhesive was prepared as illustrated in Table 9.

TABLE 9

Composition of HRC lignin-based PF resin

| Code | Solids content (%) | PF resin (Solids, %) | Lignin (Solids, %) | pH | Remarks |
|---|---|---|---|---|---|
| ComPF | 45 | 100 | — | 12.3 | |
| HRC30-PF | 45 | 70 | 30 | 12.12 | Added water and NaOH to adjust pH to that of the control |

Yellow birch veneers (1.5 mm in thickness) were used to make 3-ply plywood panels. The spread rate was 180-190 g/m$^2$ (36.8-38.8 lb/MSF), the pressure was 305 psi, the press time was 4 minutes, and the temperature was 150° C. For each formulation, 4 panels (dimensions of 300 mm by 110 mm) were made. After the panels were conditioned at 65% RH and 21° C. for two weeks, 32 specimens were cut for each formulation in which 16 specimens were cut for closed pull and 16 specimens were cut for open pull mode.

The specimens were tested after 48 hours of soaking in water. The shear strength is presented in Table 10.

TABLE 10

Shear strength of 3-ply plywood panels made with PF and lignin PF resins

| | HRC lignin in formulation (Solids/Solids) | Shear Strength | |
|---|---|---|---|
| Code | (%) | KPa | STD |
| HRC30-PF | 30 | 2281 | 491 |
| ComPF | 0 | 2400 | 551 |

After considering the standard deviation (STD) associated with the shear strength values shown in Table 10, the bond strength of the adhesive mix consisting of 30 wt % HRC lignin and 70 wt % commercial liquid PF resin, appears to compare well with that of 100 wt % commercial liquid PF resin.

Example 3

Substitution of 50 wt % of Fillers (Corncob and Superbond) in Softwood Plywood Glue Mix with HRC Softwood LignoForce™ Lignin—Mill Trial 1

In this mill trial, 50 wt % of fillers (corncob and Superbond) were substituted with softwood LignoForce™ HRC lignin. This lignin was prepared as discussed in Example 2. In this case, the content of the two fillers in the phenolic glue mix was 6.5 wt. % on a solids basis—hence, the content of lignin in the phenolic glue mix was 3.25 wt. %.

The HRC lignin was first dissolved in water at a concentration of 17 wt. %, and the lignin solution was mixed in the glue mix at a later stage during the glue mix production process. Douglas fir veneers of ⅛" thickness were used for plywood production. A total of 70 4 ft×8 ft three-ply plywood panels were produced. The panels were hot-stacked before cutting and shipping to the lab for testing. The parameters for plywood production in the mill trial are summarized in Table 11.

TABLE 11

Parameters for plywood production in the first mill trial

| Glue mixer | |
| --- | --- |
| Filler replacement level by HRC lignin | 50% |
| Total mixed weight | 800 lbs (363 kg) |
| Mixed glue viscosity | 750 cps at 90° F. (750 mPa · s at 32.2° C.) |
| Mixed glue temperature | 82° F. (27.8° C.) |
| Lay-up line | |
| Ambient temperature | 70° F. (21.1° C.) |
| Average veneer temperature | 75-100° F. (23.9-37.8° C.) |
| Glue spread rate | 60 lbs/MDGL (293.2 g/m$^2$) |
| Open assembly time (1$^{st}$ glue line to pre-press) | 9 min 40 sec |
| Closed assembly time (1$^{st}$ glue line to hot press close) | 13 min |
| Total assembly time (1$^{st}$ glue line to hot press open) | 16 min 45 sec |
| Press | |
| Pre-press time | 3 min |
| Hot press time | 4 min (2 panels/opening) |
| Hot press temperature | 315° F. (157.2° C.) |
| Inner glue line temperature | 213° F. (100.6° C.) |
| Hot press pressure | About 190 psi (1.31 MPa) |

The bonding performance of plywood panels was evaluated according to the Canadian Standard CSA O151-04 "Canadian Softwood Plywood". Twenty panels were randomly selected from the 70 test panels for this evaluation. Ten specimens were cut from each of the 20 selected test panels and the 20 control panels. Five of the specimens marked with odd numbers were tested after subjecting them to the vacuum-pressure (VP) cycle treatment and the other five marked with even numbers were tested after subjecting them to the boil-dry-boil (BDB) cycle treatment.

The glue mix produced with 50 wt % lignin substitution for fillers appeared to be quite homogeneous and free-flowing without any lumps or aggregates. The experimental glue mix was transferred into a storage tank without any abnormal residue left in the mixer. The viscosity of the glue mix was 750 cps at 90° F., which was lower than the viscosity of the control (targeted viscosity: 1250-1400 cps) normally used in mill production. However, it was still suitable for glue spreader application and other glue applicators, such as glue spray line. The glue mix was applied to the veneers using a glue spreader and the production process went smoothly without any problems with respect to processability or distribution of the glue on the veneers.

A sample of the experimental glue mix was stored at room temperature for an extended period of time. No separation, precipitation, or glue skin was observed after the experimental glue mix was stored for 5 days. The viscosity was 1020 cps at 25° C. (77° F.) after 5 days of storage, suggesting that the glue mix was stable.

TABLE 12

Shear test results of plywood panels from the first mill trial

| Filler | Shear Strength (psi) | Wood Failure (%) | % Panels passing 60% WF rate | % Panels passing 30% WF rate |
| --- | --- | --- | --- | --- |
| Vacuum-pressure cycle | | | | |
| Control | 200 (±17) | 87 (±6) | 100 | 100 |
| 50% filler substitution by HRC lignin | 207 (±16) | 86 (±4) | 100 | 100 |
| Boil-dry-boil cycle | | | | |
| Control | 196 (±21) | 89 (±4) | 100 | 100 |
| 50% filler substitution by HRC lignin | 197 (±19) | 86 (±7) | 100 | 100 |

The bond performance of both the experimental and control panels were evaluated and the test results are summarized in Table 12. As seen in this table, the shear strength of the test panels in which 50 wt % of fillers were replaced with LignoForce™ HRC lignin in the plywood glue compare well with the control panels following either the vacuum-pressure cycle or the boil-dry-boil cycle treatments. In addition, the average wood failure rates for both the control and the test panels surpassed the 60% level after either the vacuum-pressure cycle or the boil-dry-boil cycle treatments. In fact, all of the control and test panels surpassed the 80% wood failure rate either after the vacuum-pressure treatment or after the boil-dry-boil treatment. Therefore, both the control and the test panels met the bond requirements according to the Canadian standard.

Example 4

Substitution of 10 wt % of Phenol Formaldehyde (PF) Resin with Softwood LignoForce™ HRC Lignin in Plywood Glue Mix—Mill Trial 2

This example shows that 10 wt % of phenolic resin in softwood plywood phenolic glue mix formulations can be substituted with LignoForce™ HRC lignin. The content of phenolic resin (solids basis) in the control phenolic glue mix was 30.2 wt. %, which means that the content of lignin was about 3.0 wt %.

The lignin was first dissolved in an alkaline aqueous solution at a total solids content of 28 wt. %, and the lignin solution was blended into the glue mix at a later stage during the glue mix production process. Spruce veneers of ⅛" thickness were used for plywood production. About 5000 lbs of phenolic glue mix was produced and used to manufacture 3-ply plywood panels. Forty panels were randomly selected from the manufactured plywood products for bond quality testing. The forty control panels, which were manufactured under the same conditions, were tested for comparison purposes. The main parameters for plywood production in the mill trial are summarized in Table 13. The bonding performance of plywood was evaluated according to the Canadian Standard CSA O151-04 "Canadian softwood plywood", as described in Example 2.

TABLE 13

Major parameters for plywood production in the second mill trial

| | |
|---|---|
| Veneer | ⅛" thick spruce |
| Panel size and type | 48" × 96", 3-ply |
| Glue spread rate | 27 lbs/MSGL (131.9 g/m$^2$) |
| Total assembly time | Ranged from 10 min to 24 min |
| Press pressure | About 190 psi (1.31 MPa) |
| Press temperature | 138° C. (280° F.) |
| Press time | 5 min (2 panels/opening) |
| Total glue mix | About 5000 lbs |

The phenolic glue mix produced was visually examined and looked very smooth without any unacceptable lumps and aggregates. The viscosity was in the required range for glue application in the plywood mill. The glue mix appeared to spread uniformly and smoothly on the veneers and all the glue mix made was successfully used up in plywood production.

The bond performance of the plywood panels bonded with the test phenolic glue mix and the control was evaluated accordingly. The shear results are listed in Table 14. As seen in this table, the shear strength of the test panels in which 10 wt % of PF resin was replaced with LignoForce™ HRC lignin in the plywood glue compares well with that of the control panels following either the vacuum-pressure cycle treatment or the boil-dry-boil cycle treatment. In addition, the average wood failure rate surpassed 80% (industry standard requirement) for both the control and test panels after the samples were subjected to either the vacuum-pressure cycle or the boil-dry-boil cycle treatments. These results clearly demonstrate the technical feasibility of replacing 10 wt. % of phenolic resin with softwood LignoForce™ HRC lignin in phenolic glue mixes used in exterior-grade softwood plywood manufacturing.

TABLE 14

Shear test results of plywood panels from the second mill trial

| Glue Mix | Shear Strength (psi) | Wood Failure Rate (%) |
|---|---|---|
| Vacuum-pressure cycle | | |
| Control | 175 (±26) | 90 (±17) |
| 10 wt % PF substitution with HRC lignin | 170 (±28) | 83 (±25) |
| Boil-dry-boil cycle | | |
| Control | 170 (±34) | 88 (±21) |
| 10 wt % PF substitution with HRC lignin | 166 (±28) | 80 (±26) |

Example 5

Substitution of 20 wt % of Phenol-Formaldehyde Resin and 20 wt % of all Additives in Plywood Glue Mix Using Softwood LignoForce™ HRC Lignin—Mill Trial 3

This example shows that 20 wt % of phenolic resin and 20 wt % of all additives in the phenolic glue mix formulation can be substituted with softwood LignoForce™ HRC lignin. The content of phenolic resin (solids basis) in the control phenolic glue mix was 30.2 wt. %, and the additive content was 12.2 wt %. Therefore, the lignin content in the glue mix was about 8.4 wt %.

TABLE 15

Major parameters for plywood production in the third mill trial

| | |
|---|---|
| Veneer | ⅛" thick spruce |
| Panel size and type | 48" × 96", 3-ply |
| Glue spread rate | 25 lbs/MSGL (122.2 g/m$^2$) |
| Total assembly time | Ranged from 10 min to 24 min |
| Press pressure | About 190 psi (1.31 MPa) |
| Press temperature | 138° C. (280° F.) |
| Press time | 5 min (2 panels/opening) |
| Total glue mix | About 5000 lbs |

The lignin was first dissolved in an alkaline aqueous solution at a total solids content of 28 wt. %, and the lignin solution was blended into the glue mix at a later stage during the glue mix production. Spruce veneers of ⅛" thickness were used for plywood production. About 5000 lbs of phenolic glue mix was produced and used to manufacture 3-ply plywood panels. Twenty panels were randomly selected from the manufactured plywood products for bond quality testing. The twenty control panels, which were manufactured under the same conditions, were tested for comparison purposes. The main parameters for plywood production in the mill trial are summarized in Table 15. The bonding performance of plywood was evaluated according to the Canadian Standard CSA O151-04 "Canadian Softwood Plywood".

The lignin glue mix produced looked very homogeneous without any unacceptable lumps that might lead to non-uniform glue application on the veneers. The viscosity of the lignin glue mix was lower than that of the control glue mix, but it was suitable for application with the glue applicator at the mill. All the glue mix produced was successfully used in manufacturing three-ply softwood plywood panels.

TABLE 16

Shear test results of plywood panels from the third mill trial

| Glue mix | Shear Strength (psi) | Wood Failure Rate (%) |
|---|---|---|
| Vacuum-pressure cycle | | |
| Control | 163 (±26) | 81 (±28) |
| Substitution of 20 wt % PF and 20 wt % of all additives with HRC lignin | 154 (±45) | 83 (±26) |
| Boil-dry-boil cycle | | |
| Control | 148 (±39) | 80 (±31) |
| Substitution of 20 wt % PF and 20 wt % of all additives with HRC lignin | 146 (±35) | 84 (±25) |

The bond performance of the plywood panels bonded with the lignin-based glue mix and the control was evaluated and the results are shown in Table 16. As shown in this table, the average wood failure rates surpassed 80% (industry standard requirement) for the test panels after the samples were subjected to either the vacuum-pressure cycle or the boil-dry-boil cycle treatment. Both the shear strength and wood failure rate of the test panels were comparable to those of the control. These results clearly demonstrated the technical feasibility of replacing 20 wt. % of phenolic resin and 20 wt % of fillers with softwood LignoForce™ HRC lignin in phenolic glue mixes used in exterior-grade softwood plywood manufacturing.

Example 6

Substitution of 10 wt % of PF Resin and 100 wt % of Additives in Plywood Glue Mix with Softwood LignoForce™ HRC Lignin This example shows that 10 wt % of PF resin and 100 wt % of all additives in the phenolic glue mix formulation can be substituted with softwood LignoForce™ HRC lignin in plywood glue mixes. The content of PF resin (solids basis) in the control phenolic glue mix was 30.2 wt %, and the additive content was 12.2 wt %. Therefore, the lignin content in the glue mix was about 15.2%. The HRC lignin was first mixed in an alkaline aqueous solution, and the resulting lignin solution was blended with a commercial PF resin prior to plywood panel production. Spruce veneers of ⅛" thickness were used for plywood production. The control panels were also manufactured under the same conditions. The main parameters for plywood production in the pilot plant are summarized in Table 17.

TABLE 17

Major parameters for plywood production in the pilot plant

| | |
|---|---|
| Veneer | ⅛" thick spruce |
| Panel size and type | 15" × 15", 3-ply |
| Glue spread rate | 30 lbs/MSGL (146.6 g/m²) |
| Total assembly time | 20 min |
| Press pressure | About 200 psi (1.38 MPa) |
| Press temperature | 150° C. |
| Press time | 4 min |
| Panel replicates | 3 |

The bonding performance of plywood was evaluated according to the Canadian standard CSA O151-04 "Canadian Softwood Plywood". Thirty-two specimens were cut from each test panel and control panel. Sixteen of the specimens were tested after the vacuum-pressure cycle treatment and the other sixteen were tested after the boil-dry-boil cycle treatment. The lignin glue mix looked homogeneous and the viscosity was comparable to that of the control. The bonding performance of the panels was evaluated and the shear test results are listed in Table 18. As can be seen in this table, the wood failure rate of the test panels significantly surpassed 80%. Both the shear strength and wood failure rate of the test panels were comparable to or even better than those of the control panels. These results clearly demonstrated the technical feasibility of replacing 10 wt. % of phenolic resin and 100 wt % of all fillers with softwood LignoForce™ HRC lignin in phenolic glue mixes used in exterior-grade plywood manufacturing.

TABLE 18

Shear test results of softwood plywood panels manufactured in the pilot plant

| Glue mix | Shear Strength (psi) | Wood Failure Rate (%) |
|---|---|---|
| Vacuum-pressure cycle | | |
| Control | 123 (±42) | 85 (±15) |
| Substitution of 10 wt % of PF and 100 wt % of additives with HRC lignin | 130 (±52) | 91 (±9) |
| Boil-dry-boil cycle | | |
| Control | 116 (±45) | 91 (±10) |
| Substitution of 10 wt % of PF and 100% of additives with HRC lignin | 111 (±47) | 92 (±7) |

Example 7

Preparation of Lignin-Based PF Resins for OSB Manufacture Through the in-Situ Polymerization of Softwood LignoForce™ HRC Lignin with Phenol, Formaldehyde and Sodium Hydroxide or by the Post-Addition of LignoForce™ HRC Lignin to PF Resin or Lignin-Based PF Resin Two lignin-based phenol formaldehyde resins (HRC lignin-PF I and HRC lignin-PF II) were synthesized in the lab using softwood LignoForce™ HRC lignin as a partial replacement of phenol in the PF resin making process. The ratio of HRC lignin to phenol was 0.55:1 and 1:1 (solids to solids weight ratio). The molar ratio of formaldehyde to phenol was adjusted to be between 2.1 and 2.4, the solids content of the resins was about 45 wt %, the viscosity was targeted to be 150-200 cps, and the final pH was around 10.5. The resin composition and loading of the PF resin controls and the lignin-based PF resins is shown in Table 19. Table 19 also shows the composition of three additional resin formulations that were prepared through the post-addition of HRC lignin to the lab-made PF resin (No. 5) as well as the post-addition of HRC lignin to lignin-based PF resins Nos. 2 and 3. The OSB panel manufacturing parameters are shown in Table 20.

TABLE 19

Resin composition and loading

| No. | Face Resin | Form | Loading (% wt.) | Lignin in Resin (S/S) (% wt.) | Core Resin | Loading (%) |
|---|---|---|---|---|---|---|
| 1 | Lab PF | Liquid | 3.0 | 0 | Com powder PF | 3 |
| 2 | HRC lignin-PF I | Liquid | 3.0 | 20.6 | Com powder PF | 3 |
| 3 | HRC lignin-PF II | Liquid | 3.0 | 32.1 | Com powder PF | 3 |
| 4 | Com Liquid PF | Liquid | 3.0 | 0 | Com powder PF | 3 |
| 5 | lab PF + HRC lignin | Liquid | 2.5/0.5 | 16.7 | Com powder PF | 3 |
| 6 | Lignin PF I + HRL lignin | Liquid | 2.5/0.5 | 33.8 | Com powder PF | 3 |

TABLE 19-continued

Resin composition and loading

| No. | Face Resin | Form | Loading (% wt.) | Lignin in Resin (S/S) (% wt.) | Core Resin | Loading (%) |
|---|---|---|---|---|---|---|
| 7 | Lignin PF II + HRC lignin | Liquid | 2.5/0.5 | 43.4 | Com powder PF | 3 |

Post-added HRC lignin was dissolved in water at the 15 wt % solids level and added to the PF resin at the "lignin in resin solids" levels indicated in the above table (items 5-7)

TABLE 20

OSB panel manufacturing parameters

| Terms | Contents |
|---|---|
| Panel dimensions | 11.1 mm (7/16 in) × 610 mm (24 in) × 610 mm (24 in) |
| Panel construction | Random orientation/three layer |
| Mass distribution | 25/50/25 |
| Wood species | 100% Aspen |
| Supports | Wax paper at the bottom Wax paper on the top The thickness was controlled by the position of the platen |
| Target mat MC | Face: 6.5-7.5%; Core: 3.5-4.0% |
| Slack wax content | 0.5 wt % |
| Air pressure for wax application | 30 psi |
| Resin in face | 3 wt % or 4 wt % PF or lignin PF (phenolic resin made in-house) (with/without lignin (solid basis) |
| Resin in core | 3 wt % commercial PF powder resin |
| Blender | Air sprayed system |
| Blender rotation speed | 11 rpm |
| Liquid resin feeding rate | Standard |
| Dwell time | Standard for both liquid and powder |
| Target density (OD basis) | 39 ± 0.5 lb/ft³ (624 ± 24 kg/m³) |
| Press temperature | 220° C. (428° F.) (surface of platen) |
| Total press time | 150 seconds (daylight to daylight) |
| Close time | 30 seconds |
| Degas | 30 seconds |
| Replicate | 2 |

After pressing and prior to testing, all panels were conditioned in a chamber at 65% RH/20° C. for two weeks to reach the equilibrium moisture content. Internal bond (IB) strength, modulus of rupture (MOR), modulus of elasticity (MOE), 24-h thickness swelling (TS) and 24-h water absorption (WA) of the panels were tested according to ASTM D 1037-12.

The average values of IB of the OSB panels made from phenolic resin with/without lignin in the face layer are listed in Table 21.

TABLE 21

IB of OSB panels made with/without HRC lignin incorporated in phenolic resin

| | IB | | Density | |
|---|---|---|---|---|
| No. | MPa | STD | kg/m³ | STD |
| 1 | 0.27 | 0.04 | 608 | 18 |
| 2 | 0.31 | 0.06 | 616 | 18 |
| 3 | 0.31 | 0.04 | 616 | 16 |
| 4 | 0.30 | 0.04 | 607 | 25 |
| 5 | 0.32 | 0.04 | 608 | 14 |
| 6 | 0.32 | 0.04 | 608 | 14 |
| 7 | 0.32 | 0.04 | 614 | 18 |

STD: standard deviation

In the case of all specimens listed in Table 21, during testing, the failure occurred in the core. This suggested that, in all cases, the face resin was fully cured and had sufficient strength to support the specimens during the testing. As seen in Table 21, all panels had IB comparable to the two control OSB panels made from commercial PF (No. 4) and lab PF (No. 1) resins. The OSB panel made with lignin-based PF resin with HRC lignin added to it to bring the total resin lignin content to the 43.4 wt % level (No. 7) (based on total resin dry solids), also had an IB (0.32 MPa) comparable to the two controls.

The average TS and WA of all OSB panels is presented in the Table 22.

TABLE 22

TS & WA of OSB panels made with/without lignin incorporated in the phenolic resin

| | Density | TS | | WA | |
|---|---|---|---|---|---|
| No. | kg/m³ | % | STD | % | STD |
| 1 | 606.6 | 17.9 | 24.1 | 1.3 | 45.6 | 1.4 |
| 2 | 598.0 | 19.3 | 26.9 | 0.6 | 48.6 | 1.4 |
| 3 | 614.6 | 8.1 | 26.4 | 1.7 | 49.2 | 2.2 |
| 4 | 624.9 | 28.4 | 27.1 | 1.2 | 45.8 | 1.4 |
| 5 | 637.0 | 24.4 | 26.8 | 1.5 | 44.2 | 1.7 |
| 5' | 628.6 | 20.3 | 27.2 | 1.6 | 44.9 | 0.6 |
| 6 | 631.3 | 26.4 | 27.8 | 2.0 | 47.9 | 4.3 |
| 7 | 618.6 | 8.4 | 28.9 | 2.9 | 48.1 | 1.8 |

Except for the control OSB panels (No. 1) for which the PF resin was made in the lab, the others had thickness swelling comparable with the OSB panels made with the commercial PF resin control. For water absorption, all OSB panels had relatively similar values ranging from 44.2% to 49.2%.

After reaching an equilibrium in the moisture content at 65% RH and 21° C. over a period of 3 weeks, the OSB panel specimens were tested under dry conditions. The average values of the different formulations are shown in Table 23.

TABLE 23

Dry flexural properties of OSB panels made with/without lignin incorporated in phenolic resin

| | Density | | MOR | | MOE | |
|---|---|---|---|---|---|---|
| No. | kg/m³ | STD | MPa | STD | MPa | STD |
| 1 | 626.8 | 33.2 | 25.01 | 5.61 | 3540 | 484 |
| 2 | 629.1 | 17.3 | 29.33 | 4.70 | 3914 | 452 |
| 3 | 619.8 | 22.2 | 26.76 | 3.03 | 3709 | 475 |
| 4 | 622.1 | 27.0 | 25.90 | 2.69 | 3745 | 507 |
| 5 | 637.1 | 43.9 | 30.41 | 6.43 | 3857 | 528 |
| 6 | 638.7 | 27.1 | 29.73 | 8.04 | 4024 | 842 |
| 7 | 624.7 | 24.7 | 27.07 | 6.56 | 3511 | 496 |

As can be seen in Table 23, addition of HRC lignin into lab-cooked PF or lab-cooked lignin-based PF resins does not have a negative impact on the bending strength and the modulus. These results clearly demonstrated the technical feasibility of replacing 16.7-43.4 wt % of phenolic resin with softwood LignoForce™ HRCL in phenolic resin formulations used as an adhesive in OSB manufacturing.

Example 8

Post-Addition of Softwood LignoForce™ HRC Lignin to Phenol Formaldehyde Resin for OSB Applications Phenol-formaldehyde (PF) resin was synthesized in the lab using a molar ratio of formaldehyde to phenol between 1.8 and 2.1. The solids content of the resin was about 48 wt. %, the viscosity was targeted to be 1500-2500 cps and the final pH was around 10. This PF resin was divided into 6 portions. For each portion, urea and/or lignin was added to make the formulations listed in Table 24. For lignin and urea, 50 wt. % mixtures were prepared for the purpose of this investigation.

TABLE 24

Formulations of phenolic resin with/without HRC lignin & urea

| No. | PF | Lignin[1] | Urea[2] |
|---|---|---|---|
| PF resin without lignin ||||
| 1 | 100 | 0 | 30 |
| 2 | 100 | 0 | 50 |
| PF resin with addition of 20 wt % HRC lignin ||||
| 3 | 80 | 20 | 30 |
| 4 | 80 | 20 | 50 |
| PF resin with addition of 30 wt % HRC lignin ||||
| 5 | 70 | 30 | 30 |
| 6 | 70 | 30 | 50 |

[1]based on PF resin solids;
[2]based on PF resin solids plus lignin solids

A Brookfield viscometer from Brookfield Engineering Laboratories, Inc. (Middleboro, Mass., USA, 02346) and a small sample adapter also from Brookfield were used to monitor the viscosity at 25° C. At various time intervals, a 10-15 mL sample was taken out and cooled down, then placed in a water bath at 25° C. for a certain amount of time before being transferred to the small adapter of the Brookfield viscometer for the measurement of viscosity.

TABLE 25

Viscosity of different resin formulations

| No. | PF | Lignin[1] | Urea[2] | Viscosity (cps) |
|---|---|---|---|---|
| PF resin without lignin |||||
| 1 | 100 | 0 | 30 | 174 |
| 2 | 100 | 0 | 50 | 64 |
| PF resin with addition of 20 wt % HRC lignin |||||
| 3 | 80 | 20 | 30 | 450 |
| 4 | 80 | 20 | 50 | 124 |
| PF resin with addition of 30 wt % HRC lignin |||||
| 5 | 70 | 30 | 30 | 1040 |
| 6 | 70 | 30 | 50 | 188 |
| 7 (com PF) | 100 | 0 | 0 | — |

[1]based on PF resin solids;
[2]based on PF resin solids plus lignin solids

As seen in Table 25, urea addition and the ratio of urea to lignin have a significant impact on viscosity. With the addition of 30 wt. % lignin in the resin, the viscosity of the mixture of PF plus lignin is quite high. After adding urea at the 50 wt. % level, the viscosity is reduced significantly.

A series of OSB panels were made with the different resin formulations as shown in Table 26. The OSB manufacturing parameters are shown in Table 27.

TABLE 26

Composition and loading of resin formulations used to make OSB panels

| | Face Layer | | | Core Layer | |
|---|---|---|---|---|---|
| No. | Face Resin* | Form | Loading (wt %) | Core Resin | Loading (wt %) |
| 1 | No. 1 | Liquid | 3 | Commercial powder PF | 3 |
| 2 | No. 2 | Liquid | 3 | Commercial powder PF | 3 |
| 3 | No. 3 | Liquid | 3 | Commercial powder PF | 3 |
| 4 | No. 4 | Liquid | 3 | Commercial powder PF | 3 |
| 5 | No. 5 | Liquid | 3 | Commercial power PF | 3 |
| 6 | No. 6 | Liquid | 3 | Commercial powder PF | 3 |
| 7 | Com. PF | Liquid | 3 | Commercial powder PF | 3 |

*The resin codes are indicated in the previous table

TABLE 27

OSB panel manufacturing parameters with lignin

| | |
|---|---|
| Panel dimensions | 11.1 mm (7/16 in) × 610 mm (24 in) × 610 mm (24 in) |
| Panel construction | Random orientation/three layer |
| Mass distribution | 25/50/25 |
| Wood species | 100% Aspen |
| Supports | Waxed paper at the bottom, no caul plate No Frame on the top The thickness is control by position of platen |
| Target mat MC | Face: 6.5-7.5%; Core: 3.5-4.0% |
| Slack wax content | 0.5% |
| Air pressure for wax application | 30 psi (206.8 kPa) |
| Resin in face | 3 wt % PF (phenolic resin made in-house) (with/without lignin plus urea) (solid basis) |
| Resin in core | 3 wt % commercial PF powder resin |
| Blender | Air sprayed system |
| Blender rotation speed | 11 rpm |
| Liquid resin feeding rate | Standard |
| Dwell time | Standard for both liquid and powder |
| Target density (OD basis) | 39 ± 0.5 lb/ft$^3$ (624 ± 24 kg/m$^3$) |
| Press temperature | 220° C. (428° F.)(surface of platen) |

TABLE 27-continued

OSB panel manufacturing parameters with lignin

| | |
|---|---|
| Total press time | 150 seconds (daylight to daylight) |
| Close time | 30 seconds |
| Degas | 30 seconds |
| Replicate | 2 |

After pressing and prior to testing, all panels were conditioned in a chamber at 65% RH at 20° C. for several days. Internal bond (IB) strength, modulus of rupture (MOR), modulus of elasticity (MOE), 24-h thickness swelling (TS) and 24-h water absorption (WA) of the panels were tested according to ASTM D 1037-12. The vertical density profile (VDP) of each panel after conditioning was measured by an X-ray (QDP-01X Density Profile) system from 50-mm×50-mm specimens, which were also used for measuring IB strength afterwards. As mentioned before, to investigate the impact of post-addition (via post-blending) of HRC lignin and urea on the phenolic resin performance, several formulations were prepared in which either 30 wt. % or 50 wt. % urea was added to the phenolic resins containing 20 wt. % or 30 wt. % HRC lignin. The solids contents of the various formulations are illustrated in Table 28.

TABLE 28

Solids content of the various components in resin formulations

| Resin Formulation | Ratio of components expressed on a % dry solids basis | | | Dry solids content based on a liquid (wt. %) basis | | | |
|---|---|---|---|---|---|---|---|
| | PF | lignin | urea | PF | Lignin | urea | Total |
| 1 | 76.9 | 0.0 | 23.1 | 37.3 | 0.0 | 11.2 | 48.4 |
| 2 | 66.7 | 0.0 | 33.3 | 32.4 | 0.0 | 16.2 | 48.6 |
| 3 | 61.5 | 15.4 | 23.1 | 30.0 | 7.5 | 11.3 | 48.8 |
| 4 | 53.3 | 13.3 | 33.3 | 26.1 | 6.5 | 16.3 | 48.9 |
| 5 | 53.8 | 23.1 | 23.1 | 26.3 | 11.3 | 11.3 | 48.9 |
| 6 | 46.7 | 20.0 | 33.3 | 22.9 | 9.8 | 16.3 | 49.0 |
| 7 | 100 | 0 | 0 | 48.0 | 0 | 0 | 48.0 |

As can be seen in Table 28, the addition of lignin and urea into a PF resin formulation can dramatically reduce the PF resin content in the formulation thereby leading to significant cost savings given that both HRC lignin and urea are less expensive than PF resins. For example, in resin formulation No. 6, the resin contains less than 50 wt. % PF resin (46.7 wt. %) in the formulation.

The internal bonding strength (IB) of OSB samples made with the different formulations is listed in Table 29.

TABLE 29

Internal bonding (IB) of OSB made with different resin formulations

| Code | Density kg/m$^3$ | IB Mpa | adj IB* Mpa |
|---|---|---|---|
| 1 | 662 ± 14 | 0.565 ± 0.058 | 0.546 ± 0.052 |
| 2 | 661 ± 29 | 0.488 ± 0.065 | 0.474 ± 0.073 |
| 3 | 657 ± 11 | 0.552 ± 0.057 | 0.537 ± 0.049 |
| 4 | 674 ± 23 | 0.531 ± 0.068 | 0.507 ± 0.064 |
| 5 | 661 ± 19 | 0.532 ± 0.058 | 0.515 ± 0.053 |
| 6 | 656 ± 16 | 0.484 ± 0.075 | 0.472 ± 0.076 |
| Com PF | 637 ± 22 | 0.517 ± 0.076 | 0.512 ± 0.059 |

*Adj. IB: adjusted IB to 640 kg/m3 by IB × (640/density)

After considering the standard deviation of the samples tested, there are no significant differences among the different formulations even though the addition of 50 wt. % urea in any given formulation (e.g. formulations 2, 4 and 6) appears to lead to a lower IB compared to less urea in the formulation (e.g. formulations 1, 3 and 5).

The thickness swelling (TS) and water absorption (WA) of OSB panels made with the different formulations of this example are presented in Table 30.

TABLE 30

TS & WA of OSB made with different resin formulations

| Code | Density kg/m$^3$ | TS % | WA % |
|---|---|---|---|
| 1 | 636 ± 26 | 22.4 ± 2.1 | 42.9 ± 3.6 |
| 2 | 641 ± 30 | 22.3 ± 1.8 | 43.7 ± 3.6 |
| 3 | 650 ± 34 | 25.5 ± 2.7 | 44.1 ± 3.7 |
| 4 | 648 ± 24 | 25.6 ± 2.3 | 45.9 ± 2.1 |
| 5 | 635 ± 39 | 24.3 ± 3.0 | 46.3 ± 5.2 |
| 6 | 645 ± 20 | 24.1 ± 2.6 | 41.6 ± 1.9 |
| Com PF | 638 ± 30 | 25.3 ± 1.6 | 47.5 ± 3.6 |

As shown in Table 30, in the case of resin formulations incorporating HFC lignin, the average values for thickness swelling are of the same order of magnitude as those of the controls.

The bending strength (MOR) and bending modulus (MOE) of OSB panels made with different formulations and tested under dry conditions are shown in Table 31.

TABLE 31

MOE & MOR of OSB made with different resin formulations (dry condition)

| Code | Density Kg/m$^3$ | MOE MPa | MOR MPa | adjusted MOE* MPa | adjusted MOR* MPa |
|---|---|---|---|---|---|
| 1 | 632 | 5223 ± 382 | 39.11 ± 5.03 | 5288 ± 264 | 39.48 ± 3.19 |
| 2 | 642 | 5073 ± 059 | 35.48 ± 7.09 | 5067 ± 1115 | 35.43 ± 7.44 |
| 3 | 632 | 4830 ± 756 | 32.42 ± 9.59 | 4886 ± 725 | 32.77 ± 9.43 |
| 4 | 621 | 4928 ± 423 | 34.33 ± 5.08 | 5076 ± 432 | 35.37 ± 5.28 |
| 5 | 629 | 4970 ± 315 | 36.98 ± 5.36 | 5060 ± 279 | 37.62 ± 5.01 |
| 6 | 624 | 4633 ± 419 | 29.57 ± 3.23 | 4744 ± 311 | 30.34 ± 3.49 |
| Com PF | 659 | 4706 ± 180 | 32.29 ± 4.37 | 4580 ± 321 | 31.45 ± 4.82 |

(640/density); adjusted MOR = MOR × (640/density)

As seen in Table 31, at the 30 wt. % urea addition level, post-addition of lignin into PF resins does not significantly reduce the strength (MOR) and the modulus (MOE). However, at the 50 wt % urea addition level, there is some reduction in strength. The bending strength (MOR) and bending modulus (MOE) of OSB panels made with different formulations and tested under wet conditions are listed in Table 32.

TABLE 32

MOE & MOR of OSB made with different formulations (wet condition)

| Code | Density Kg/m$^3$ | MOE MPa | MOR MPa | adj MOE* MPa | adj MOR* MPa |
|---|---|---|---|---|---|
| 1 | 650 | 2807 ± 489 | 18.07 ± 4.42 | 2754 ± 384 | 17.73 ± 4.08 |
| 2 | 636 | 2310 ± 361 | 16.03 ± 3.24 | 2332 ± 398 | 16.21 ± 3.63 |
| 3 | 627 | 2428 ± 526 | 15.81 ± 3.07 | 2468 ± 465 | 16.10 ± 2.82 |
| 4 | 642 | 2344 ± 298 | 16.20 ± 2.72 | 2331 ± 225 | 16.13 ± 2.57 |
| 5 | 640 | 2186 ± 226 | 15.01 ± 4.84 | 2183 ± 181 | 14.93 ± 4.56 |
| 6 | 644 | 2454 ± 273 | 15.48 ± 2.55 | 2437 ± 256 | 15.38 ± 2.55 |
| Com PF | 654 | 2676 ± 269 | 19.31 ± 1.98 | 2618 ± 236 | 18.89 ± 1.71 |

(640/density); adjusted MOR = MOR × (640/density)

As seen in Table 32, under wet conditions, at the 50 wt. % urea addition level (formulations 2 and 4), the MOE and MOR are somewhat lower than what was obtained with the commercial resin control and/or formulations in which urea was used at the 30 wt % urea addition level.

The above results demonstrated that post-addition of softwood LignoForce™ HRC lignin into phenolic resins increases the viscosity of the resin system—the higher the lignin content, the higher is the viscosity. However, the incorporation of urea into the resin system reduces the viscosity—the higher the urea charge the lower the viscosity. The above results also showed that by adding urea to PF resin formulations, it becomes possible to partially replace PF resin with softwood LignoForce™ HRC lignin at the 22-30 wt. % replacement level (based on resin solids) without any significant decrease in the mechanical and physical properties of 3-layer sandwich OSB panels such as IB, TS & WA and MOE & MOR. These results show that post-addition of LignoForce™ HRC lignin to PF resins for use as an adhesive in OSB manufacturing is a technically feasible and cost-effective option.

The invention claimed is:

1. A wood adhesive comprising a residual content of lignin and
at least one of
i) a formaldehyde; a phenol; and a sodium hydroxide or
ii) a phenol formaldehyde resin,
wherein the lignin has an ash content of greater than 19.53 to 30 wt % ash, and a pH of greater than 9.66 to 11.2.

2. The wood adhesive of claim 1, wherein the lignin is selected from the group consisting of softwood, hardwood, annual plants and combinations.

3. The wood adhesive of claim 1 wherein the lignin is 0.5 to 50 wt % of the adhesive solids.

4. The wood adhesive of claim 3 wherein the lignin is 2.5 to 30 wt % of the adhesive solids.

5. A method of producing a wood adhesive comprising
providing a residual content of lignin, wherein the lignin has an ash content of greater than 19.53 to 30 wt % ash, and a pH of greater than 9.66 to 11.2; and
at least one of
i) providing a formaldehyde, a phenol and a sodium hydroxide; or ii) providing a phenol formaldehyde resin;
mixing the lignin and either i) the sodium hydroxide, formaldehyde and phenol or ii) the phenol formaldehyde resin to produce the adhesive.

6. The method of claim 5 wherein the lignin is 0.5 to 50 wt % of the adhesive.

7. The method of claim 6, wherein the lignin is 2.5 to 30 wt % of the adhesive.

8. An adhesive comprising
a residual content of lignin, wherein the lignin has an ash content of greater than 19.53 to 30 wt % ash, and a pH of greater than 9.66 to 11.2, and
at least one of the following selected from the group consisting of i) a formaldehyde, a phenol, a sodium hydroxide; ii) a phenol formaldehyde resin; iii) Melamine-Urea-Phenol-Formaldehyde (MUPF) resin; iv) phenol resorcinol formaldehyde (PRF) resin; and combinations thereof.

9. The wood adhesive of claim 1, wherein said lignin is a kraft lignin.

10. The method of claim 5, wherein the lignin is directly produced from a kraft lignin recovery system.

11. The adhesive of claim 8, wherein the lignin is directly produced from a kraft lignin recovery system.

12. The adhesive of claim 10, wherein the kraft lignin recovery system is the LignoForce system.

13. The adhesive of claim 11, wherein the kraft lignin recovery system is the LignoForce system.

* * * * *